(12) United States Patent
Dannhauser et al.

(10) Patent No.: US 9,573,349 B1
(45) Date of Patent: Feb. 21, 2017

(54) MULTILAYERED STRUCTURE WITH WATER-IMPERMEABLE SUBSTRATE

(71) Applicant: Eastman Kodak Company, Rochester, NY (US)

(72) Inventors: Thomas Joseph Dannhauser, Pittsford, NY (US); Douglas Eugene Bugner, Rochester, NY (US); David D. Putnam, Fairport, NY (US); Brian L Lindstrom, Victor, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/813,491

(22) Filed: Jul. 30, 2015

(51) Int. Cl.
*B41M 5/00* (2006.01)
*B32B 27/08* (2006.01)
(Continued)

(52) U.S. Cl.
CPC ............. *B32B 27/08* (2013.01); *B32B 7/12* (2013.01); *B32B 27/32* (2013.01); *B32B 27/36* (2013.01);
(Continued)

(58) Field of Classification Search
CPC B32B 7/12; B32B 27/36; C08L 29/04; C09D 11/30; B41M 5/502; B41M 5/506; B41M 5/508; B41M 5/5218; B41M 5/5245
See application file for complete search history.

(56) References Cited

U.S. PATENT DOCUMENTS

| 3,747,120 A | 7/1973 | Stemme |
| 3,946,398 A | 3/1976 | Kyser et al. |

(Continued)

FOREIGN PATENT DOCUMENTS

| EP | 2 692 536 | 2/2014 |
| EP | 2 730 424 A1 | 5/2014 |

(Continued)

*Primary Examiner* — Betelhem Shewareged
(74) *Attorney, Agent, or Firm* — Raymond L. Owens; J. Lanny Tucker

(57) ABSTRACT

In accordance with the present invention, there is provided a multi-layered structure includes:
a) a water-impermeable substrate;
b) a first layer on at least one surface of the substrate comprising a water-based tie-layer composition;
c) a second layer formed over the first layer, wherein the second layer is a water-based ink-receptive composition includes:
  i) a multivalent metal salt; and
  ii) a hydrophilic binder polymer;
d) a third layer including at least one water-based ink composition deposited in a single pass by an inkjet printing process, wherein the water-based ink composition includes an anionically stabilized, water-dispersible pigment; and
e) additional layers deposited over the one or more ink layers and exposed second layer, the additional layers selected from one or more of the following compositions:
  i) an opaque white layer;
  ii) a protective layer; and
  iii) an adhesive layer, further includes a continuous protective plastic or paper layer adhered thereto.

18 Claims, 6 Drawing Sheets

(51) Int. Cl.

| | |
|---|---|
| *C09D 11/30* | (2014.01) |
| *C08L 29/04* | (2006.01) |
| *C08L 33/14* | (2006.01) |
| *C09J 175/04* | (2006.01) |
| *B32B 27/32* | (2006.01) |
| *B32B 27/36* | (2006.01) |
| *B32B 27/40* | (2006.01) |
| *B32B 7/12* | (2006.01) |
| *B41M 5/50* | (2006.01) |
| *B41M 5/52* | (2006.01) |

(52) U.S. Cl.
CPC .............. *B32B 27/40* (2013.01); *B41M 5/502* (2013.01); *B41M 5/506* (2013.01); *B41M 5/508* (2013.01); *B41M 5/5218* (2013.01); *B41M 5/5245* (2013.01); *C08L 29/04* (2013.01); *C08L 33/14* (2013.01); *C09D 11/30* (2013.01); *C09J 175/04* (2013.01); *B32B 2250/24* (2013.01); *B32B 2255/10* (2013.01); *B32B 2255/26* (2013.01); *B32B 2307/4026* (2013.01); *B32B 2307/41* (2013.01); *B32B 2307/412* (2013.01); *B32B 2307/75* (2013.01)

(56) References Cited

U.S. PATENT DOCUMENTS

| | | | |
|---|---|---|---|
| 4,296,421 A | 10/1981 | Hara et al. | |
| 5,026,427 A | 6/1991 | Mitchell et al. | |
| 5,141,556 A | 8/1992 | Matrick | |
| 5,160,370 A | 11/1992 | Suga et al. | |
| 5,380,586 A | 1/1995 | Knoerzer et al. | |
| 5,478,705 A | 12/1995 | Czekai et al. | |
| 5,513,805 A | 5/1996 | Fisher et al. | |
| 5,651,813 A | 7/1997 | Santilli et al. | |
| 5,662,279 A | 9/1997 | Czekai et al. | |
| 5,679,138 A | 10/1997 | Bishop et al. | |
| 5,766,398 A | 6/1998 | Cahill et al. | |
| 5,862,999 A | 1/1999 | Czekai et al. | |
| 5,891,231 A | 4/1999 | Gnerlich et al. | |
| 5,985,017 A | 11/1999 | Bugner et al. | |
| 5,985,071 A | 11/1999 | Wynne et al. | |
| 6,087,051 A * | 7/2000 | Shoji ................... B41M 7/0027 347/105 |
| 6,165,699 A | 12/2000 | Bauer et al. | |
| 6,346,353 B1 | 2/2002 | Wang et al. | |
| 6,517,197 B2 | 2/2003 | Hawkins et al. | |
| 6,554,410 B2 | 4/2003 | Jeanmaire et al. | |
| 6,575,566 B1 | 6/2003 | Jeanmaire et al. | |
| 6,588,888 B2 | 7/2003 | Jeanmaire et al. | |
| 6,589,636 B2 * | 7/2003 | Emslander ................ B41M 5/52 428/195.1 |
| 6,600,559 B2 | 7/2003 | Switalski et al. | |
| 6,682,182 B2 | 1/2004 | Jeanmaire et al. | |
| 6,793,328 B2 | 9/2004 | Jeanmaire | |
| 6,863,385 B2 | 3/2005 | Jeanmaire et al. | |
| 6,866,370 B2 | 3/2005 | Jeanmaire | |
| 7,441,717 B1 | 10/2008 | Majka et al. | |
| 7,858,161 B2 | 12/2010 | Nair et al. | |
| 8,076,394 B2 | 12/2011 | Kabalnov | |
| 8,173,215 B2 | 5/2012 | Sowinski et al. | |
| 8,398,191 B2 | 3/2013 | Cook et al. | |
| 8,398,226 B2 | 3/2013 | Higgins et al. | |
| 8,419,176 B2 | 4/2013 | Dockery et al. | |
| 8,434,857 B2 | 5/2013 | Falkner et al. | |
| 8,455,570 B2 | 6/2013 | Lindstrom et al. | |
| 8,479,478 B2 | 7/2013 | Cleckner et al. | |
| 8,500,264 B2 | 8/2013 | Mukai et al. | |
| 2001/0008908 A1 * | 7/2001 | Parazak ................ C09D 11/40 523/160 |
| 2003/0152753 A1 * | 8/2003 | Waller, Jr. ................ B41M 5/52 428/195.1 |
| 2004/0033377 A1 * | 2/2004 | Koenig ................ B41M 5/0011 428/458 |
| 2005/0075415 A1 | 4/2005 | Harz et al. | |
| 2006/0012654 A1 | 1/2006 | Wang et al. | |
| 2007/0043144 A1 | 2/2007 | House et al. | |
| 2007/0145122 A1 * | 6/2007 | Haas ..................... G06K 1/121 235/380 |
| 2011/0123714 A1 | 5/2011 | Yau et al. | |
| 2011/0279554 A1 | 11/2011 | Dannhauser et al. | |
| 2012/0274685 A1 | 11/2012 | Mis et al. | |
| 2013/0187998 A1 | 7/2013 | Ohmoto | |
| 2013/0216738 A1 * | 8/2013 | Owusu ................ B41M 5/52 428/32.25 |
| 2013/0293649 A1 | 11/2013 | Belbeck | |
| 2014/0160211 A1 | 6/2014 | Aoki | |
| 2014/0292951 A1 | 10/2014 | Ferrar et al. | |

FOREIGN PATENT DOCUMENTS

| | | |
|---|---|---|
| EP | 2 617 577 | 12/2014 |
| EP | 2 889 148 A1 | 7/2015 |
| WO | 2009/044096 | 4/2009 |
| WO | 2009/113097 | 9/2009 |
| WO | 2011/028201 | 3/2011 |
| WO | 2012/102737 | 8/2012 |
| WO | 2014/042652 | 3/2014 |

* cited by examiner

MULTILAYERED STRUCTURE WITH WATER-IMPERMEABLE SUBSTRATE

CROSS REFERENCE TO RELATED APPLICATIONS

Reference is made to commonly-assigned copending U.S. patent application Ser. No. 14/813,462, filed Jul. 30, 2015 (now allowed), entitled PRINTING ON WATER-IMPERMEABLE SUBSTRATES WITH WATER-BASED INKS, by Bugner et al.; the disclosure of which is incorporated herein.

FIELD OF THE INVENTION

The present invention relates to a method of depositing water-based inkjet inks on water-impermeable substrates and to multilayered structures and articles produced therefrom.

BACKGROUND OF THE INVENTION

High speed digital inkjet printing systems have recently found much success in competing with traditional analog printing presses in applications such as commercial printing and publishing. In particular inkjet printing systems which employ water-based pigment inks can rival the print quality and productivity of printing systems which are based on analog impact printing, such as lithography, gravure, and flexographic printing processes. The ability of digital inkjet printing systems to cost-effectively print either short run lengths or continuously variable information offers distinct advantages over analog impact printing processes which require the presses to be idled in between print jobs in order to change over the printing plates or cylinders. More recently, high productivity inkjet printing systems have targeted decor and package printing with the same advantages. However, décor and package printing, unlike commercial printing and publishing, commonly employ water-impermeable plastic substrates in addition to paper-based substrates. Plastic substrates are particularly challenging for water-based inks due to the difficulty in getting the inks to wet and adhere to such substrates, which are typically designed and chosen to repel or otherwise present a barrier to water. Although solvent-based and radiation curable (UV-curable) inkjet inks have been used with some success on plastic substrates, they are limited to certain types of inkjet printing systems, such as piezoelectric drop-on-demand systems, and come with health, safety, and environmental concerns compared to water-based inks.

When water-based inkjet inks useful for high speed digital inkjet printing, especially inks that comprise more than about 80 wt % water and less than about 10-15 wt % of organic co-solvents, are deposited on commonly available plastic substrates used for décor and packaging applications, the ink drops tend to either bead up or flow across the surface of the substrate, resulting in image quality artifacts known as mottle, coalescence, and intercolor bleeding. In addition, water-based inks with levels of co-solvents greater than about 10-15 wt % are very difficult to completely dry, resulting in a sticky or tacky ink layer.

WO 2009/113097 A2 discloses a process for printing on a plastic film with water-containing inks. However, the water-containing inks disclosed in this publication are intended for flexographic or offset printing, and are not suitable for high speed inkjet printing due to their high viscosities. There is no teaching as to how these types of inks can be modified for use in a high speed inkjet deposition system.

Another approach to printing directly onto hydrophobic impermeable substrates with water-based inkjet inks is disclosed by Higgins, et al., in U.S. Pat. No. 8,398,226. This process employs water-based inks comprising certain stimuli-responsive additives to permit direct printing onto untreated impermeable plastic. These inks rely, for example, on a thermal phase-change of an incorporated microgel, which causes the inks to rapidly viscosify when a heated ink is deposited onto a relatively cool substrate. In practice the inks need to be kept at an elevated temperature in a low viscosity state prior to printing, and the substrate needs to be held below the phase-change temperature of the water-based ink containing the microgel additive. This imposes additional and expensive constraints on the overall printing system.

Water-based pigment inks suitable for printing directly onto a vinyl medium for signage or display applications are disclosed in WO 2011/028201 A1. However, these inks contain mixtures of dispersed polymer particles that require the printed substrate to be heated above 50° C. to melt and fuse the inks to the vinyl medium. The temperatures required for the fusing step are problematic in that many water-impermeable plastic substrates useful for packaging and décor applications are prone to wrinkling or melting at temperatures as low as 50° C.

Another method for printing on plastic films with water-based pigment inks is disclosed in U.S. Pat. No. 8,500,264 B2. This method involves the steps of depositing water-based inks onto an untreated plastic film and heating the plastic film surface to 40° C. or greater. The inks further comprise "a silicone surfactant, an acetylene glycol surfactant, a pyrrolidone derivative, and a thermoplastic resin." However, as the examples in this patent clearly demonstrate, when the inventive inks are deposited on a representative plastic film at ink coverages greater than about 60 to 70%, the "bleeding" between colors or the image non-uniformity of solid areas ("mottling") is judged as "bad". This severely limits the applicability of this method for most packaging applications for which much higher ink coverages are desired.

U.S. Publication No. 2014/0160211 A1 discloses a method for printing with water-based ink compositions onto a non-absorptive medium while simultaneously heating the medium. The water-based inks further comprise thermoplastic resin particles and first and second co-solvents with specified boiling points and surface tension properties. With many water-impermeable plastic substrates, especially very thin flexible films used for packaging applications, the application of heat while printing can adversely affect the dimensional stability of the film, leading to poor color-to-color registration.

U.S. Publication No. 2013/0187998 A1 discloses water-based inkjet inks with improved scratch resistance that comprise polymer particles and a hydroxyl amine compound that are intended to be printed directly onto non-absorbent polypropylene substrates, such as a non-woven fabric. A key limitation of this method is that the ink drops are between 60 pL and 120 pL, which is much too large to meet the print quality and resolution requirements for many applications, and the viscosity of the ink is greater than 4 mPa-s, which further limits the rate at which ink drops are deposited.

Yet another approach to printing onto impermeable substrates is disclosed in U.S. Pat. No. 8,076,394. This method utilizes the combination of a reactive fixing fluid and water-based inks comprising a specific co-reactive polymer species. When such inks are deposited on substrates which have been pre-treated with the reactive fixing fluid, the inks are claimed to rapidly increase in viscosity, or gel, thereby immobilizing the ink drop. There are several problems with this approach. First, the fixing fluids useful in this printing system comprise boric acid, borax, or copper sulfate, which are problematic in certain food packaging applications. Second, inks comprising the exemplified co-reactive polymer species are limited to those which comprise specific co-solvent humectants, and which require effective levels of the co-reactive polymer species, the combination of which results in inks with viscosities greater than about 10 mPa-s, making them disadvantaged for high speed inkjet depositions systems.

The use of an adhesion layer between an impermeable substrate and an ink-printable layer is disclosed in WO 2012/102737 A1. However, these layers are formed using melt extrusion or co-extrusion processes, and are intended for printing with either UV-curable or latex inkjet inks. As noted above, UV-curable inks are undesirable for health and safety reasons, and latex inks require a secondary heating and fusing step which is problematic for thin, low-melting substrates.

EP 2692536 A1 also discloses the use of an adhesion-promoting layer for use on polyolefin packaging films in combination with an ink-receptive layer suitable for water-based inks. An undesirable feature of this solution is that it is limited to polyolefin substrates to which an adhesion-promoting layer has been formed by either a co-extrusion or lamination process. Further, the exemplified ink-receptive layers are each relatively thick, e.g., 10 micrometers, which can adversely affect the cost and performance of very thin film structures.

EP 2617577 A1 discloses a solution to improving the adhesion of a water-based inkjet ink when printed onto hydrophobic polyolefin films. One option includes surface treating the polyolefin film to introduce polar hydrophilic groups, for example with a corona or plasma treatment discharge process, followed by depositing a water based inkjet ink onto the surface treated polyolefin film. Also disclosed is a second surface treatment, e.g., corona or plasma discharge, after inkjet recording, followed by the application of a protective over coating which contains a wax. When the inks contain specific co-solvents the protective overcoat is not required, and when the protective overcoat is employed, the first surface treatment is not required. In either embodiment, a separate ink-receptive layer is neither required nor disclosed with this system. However, the present inventors have found that hydrophilic surface treatments, such as corona or plasma discharge are insufficient to control lateral ink spread on impermeable films when water-based inkjet inks are deposited thereon, especially in areas of high ink coverage, as will be illustrated and disclosed in more detail below.

A "fixer fluid" comprising a cationic polymer and a high boiling organic co-solvent for use as a pre-coating for printing onto vinyl substrates with "anionic aqueous inks" to enable printing on non-porous substrates is disclosed in WO 2014/042652 A1. However, as disclosed hereinafter, the use of high-boiling organic co-solvents is undesirable, and ink-receptive fixer layers comprising cationic polymers are not suitable for high speed printing with anionically stabilized water-based pigment inks.

To overcome these problems and limitations of printing onto water-impermeable substrates with water-based inkjet inks, particularly those comprising anionically stabilized pigments, the surface of the substrate is pre-coated with water-based ink-receptive compositions comprising multivalent metal salts and hydrophilic binders. Dannhauser and Campbell, in U.S. Publication No. 2011/0279554 A1, disclose an inkjet receiving medium suitable for high speed inkjet printing which includes a substrate having a topmost layer coated thereon comprising a water soluble salt of a multivalent metal cation and a hydrophilic polymer binder. However, even the step of applying a water-based layer comprising multivalent metal cations, such as those disclosed in U.S. Publication No. 2011/0279554 A1, to an impermeable plastic substrate can still be problematic due to the poor wetting and adhesion characteristics of most untreated plastic surfaces by water-based coating fluids. A further problem that has been encountered is that non-volatile co-solvents known as humectants that are commonly added to inkjet inks cannot absorb into the impermeable substrates, which can lead to a prolonged sticky or tacky feel to the surface of the dried ink layers. Yet another problem that is encountered is insufficient layer-to-layer adhesion or intra-layer cohesion when such printed films are further post-coated or laminated to produce the final multi-layered package or article. Thus there is a need for an improved method of forming multi-layered printed images with water-based inkjet inks on impermeable substrates which addresses the problems and limitation listed above.

In addition to the aforementioned objectives, in view of the overall health, safety, and environmental considerations of the manufacturing processes and intended applications of the present invention, especially for flexible film food packaging and labels, it is an overarching objective of this invention to use water-based tie-layers, water-based ink-receptive layers, and water-based pigment inks, which contain less than 15 wt % of organic co-solvents and which do not contain radiation curable sensitizers, initiators, monomers, or oligomers.

SUMMARY OF THE INVENTION

It has been found after extensive investigations, that by the application of the appropriate surface treatments and water-based pre- and post-print coatings to a water-impermeable plastic substrate, a printed image and multi-layered article of high print quality and high durability is produced at high speed with a water-based inkjet ink comprising more than 80 wt % water and which contains less than 15 wt % organic co-solvents and does not contain any radiation curable sensitizers, initiators, monomers, or oligomers.

In accordance with the present invention, there is provided a multi-layered structure includes:
  a) a water-impermeable substrate;
  b) a first layer on at least one surface of the substrate comprising a water-based tie-layer composition;
  c) a second layer formed over the first layer, wherein the second layer is a water-based ink-receptive composition includes:
   i) a multivalent metal salt; and
   ii) a hydrophilic binder polymer;
  d) a third layer including at least one water-based ink composition deposited in a single pass by an inkjet printing process, wherein the water-based ink composition includes an anionically stabilized, water-dispersible pigment; and
  e) additional layers deposited over the one or more ink layers and exposed second layer, the additional layers selected from one or more of the following compositions:

i) an opaque white layer;
ii) a protective layer; and
iii) an adhesive layer, further includes a continuous protective plastic or paper layer adhered thereto.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Figure 1:
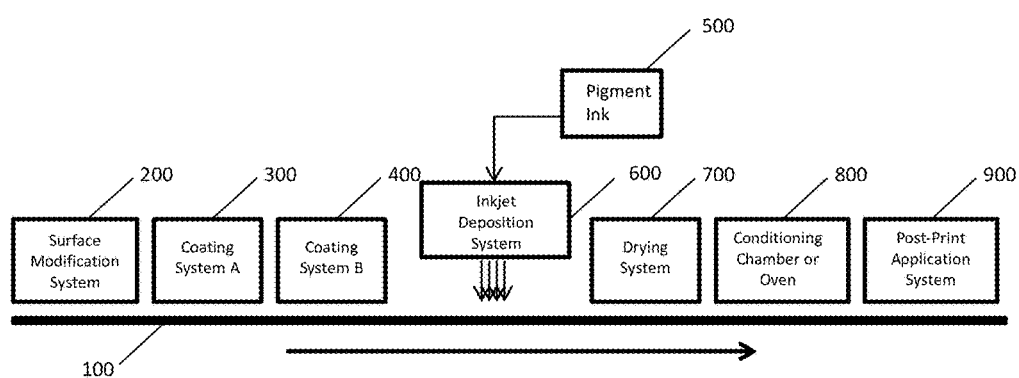
FIG. 1 is a schematic of a system for practicing the method of the present invention.

In accordance with the objectives of the present invention, FIG. 1 shows a water-impermeable substrate 100, is useful as a structural component of a packaging or décor article intended to be printed with a high productivity digital inkjet deposition system 600 comprising water-based pigment inks 500. The water-impermeable substrate 100 is transparent, translucent, or opaque, and it is colored or colorless. The water-impermeable substrate 100 includes cellulose ester derivatives, such as cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate; polyimides; polyamides; polycarbonates; polystyrenes; polyolefins, such as polyethylene or polypropylene; polysulfones; polyacrylates; polyetherimides; polyurethanes; vinyls, such as polyvinyl acetate, polyvinyl chloride and polyvinylidene chloride; and copolymers, mixtures, co-extrudates, and laminates thereof. The salient features of a typical water-impermeable substrate 100 are that (a) the surface energy of the side to be printed upon, as measured by using a set of "dyne pens" such as those manufactured by Accudyne Test Marker Pens, Diversified Enterprises, Claremont, N.H., is often less than about 50 dyn/cm, sometimes less than 40 dyn/cm, as received, and (b) the surface of the side to be printed upon is a continuous non-porous surface that does not readily absorb or transmit water.

Before a water-based coating fluid or ink is applied to a water-impermeable substrate 100, the surface should be modified to increase the surface energy to greater than about 45 dyn/cm in order to adequately wet the surface by the coating fluid or ink. The surface energy of the substrate is adjusted by using a surface modification system 200, such as a corona discharge treatment (CDT) system, a plasma discharge treatment system, a flame ionization treatment system, an atomic layer deposition system, or similar such systems that are designed to increase the surface energy and thereby the wettability of low-surface energy substrates. A CDT system is preferred for most common plastic substrates. Corona treatment is accomplished by exposing the film surface to a high voltage corona discharge unit while passing the film between two spaced electrodes. Such systems are readily available in the coatings industry. For example, see U.S. Pat. No. 8,479,478 for a discussion of surface treatment processes and methods of characterizing the surface energy or "wetting tension" of treated film surfaces. It has been found for water-based coating fluids and inks, a static surface energy of greater than 50 dyn/cm is required to achieve adequate wetting. The optimum surface energy of the substrate will depend on the actual surface tension of the coating fluid or ink composition, which can vary as a function of the types and amounts of the ingredients of the composition, as will be described in more detail below. For the water-based coating fluid and ink compositions of the present invention, a surface energy in the range of 50-60 dyn/cm is preferred.

It has been found that simply adjusting the surface energy of the water-impermeable substrate 100 to achieve adequate wetting with a water-based coating fluid or ink is insufficient to produce acceptable print quality and durability. When a drop of a water-based ink with a static surface tension of >30 dyn/cm is deposited directly on a water-impermeable substrate 100 which has been surface modified to achieve a surface energy of >50 dyn/cm, effective wetting of the water-based ink is observed, but when a water-based pigment ink 500 is used, the colorant will also spread, often concentrating at the edges of the ink spot as it dries, causing a so-called "coffee ring" artifact. Likewise, when two drops are placed directly adjacent to each other before either drop has had a chance to dry, as is often encountered with high-speed, page-wide, singe-pass inkjet deposition systems (600), the drops will spread and coalesce into each other, leading to objectionable levels of grain and mottle. Further, when more than one color of ink is deposited, intercolor bleeding between ink drops is observed.

Figure 2:
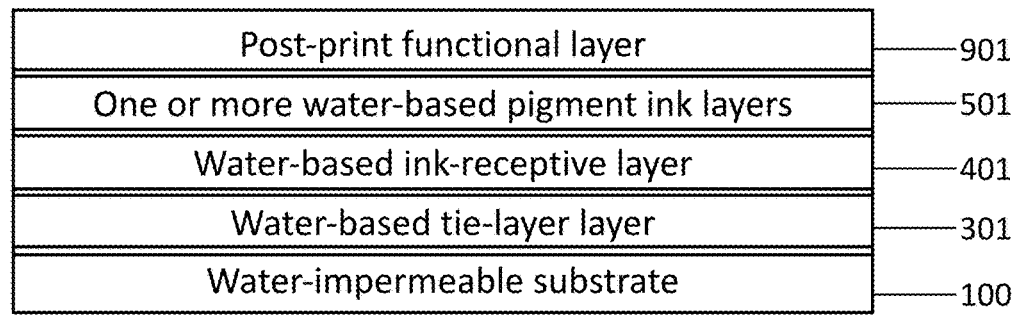
FIG. 2 is a diagram illustrating the multi-layered structure of the present invention.

FIG. 2 shows when a water-based ink-receptive layer 401 comprising a multivalent metal salt and a hydrophilic polymer, such as those described by Dannhauser and Campbell in U.S. Publication No. 2011/0279554 A1, is applied to a water-impermeable substrate 100, which has been surface modified to achieve a surface energy of >50 dyn/cm, a high quality, defect-free coated layer is achieved. Further, when an anionically stabilized water-based pigment ink (500) is deposited on the water-based ink-receptive layer 401, very sharp, circular spots are formed with minimal colorant spreading, and effective print quality is observed. However, the adhesion of the water-based ink-receptive layer 401 to the water-impermeable substrate 100 is weak, and it is readily removed from the substrate by a simple tape test or by a dry rub test. Subsequent treatment of such a printed ink-receptive layer with elevated levels of moisture and heat, as disclosed in copending U.S. application Ser. No. 14/302,866 will improve both the cohesive strength of the water-based pigment ink layer 501 as well as the adhesion of the water-based pigment ink layer 501 to the water-based ink-receptive layer 401. However, the adhesion of the water-based ink-receptive layer 401 to the water-impermeable substrate 100 is not appreciably improved. Therefore, a tie-layer, also sometimes referred to in the art as a "chemical primer" or "subbing layer", is required. The tie-layer should form a strong adhesive bond to both the water-impermeable substrate 100 and the water-based ink-receptive layer 401.

In keeping with one of the overarching objectives of the instant invention, a water based tie-layer 301 is preferred. Water-based tie-layers 301 useful for improving the adhesion of ink-receptive layers to hydrophobic photographic substrates, such as polyester films or polyethylene coated papers, are described in U.S. Pat. Nos. 6,165,699 and 7,858,161, the disclosures of which are herein incorporated by reference. Examples of suitable adhesion promoting tie-layers include, for example, halogenated phenols, partially hydrolyzed vinyl chloride-co-vinyl acetate polymer, vinylidene chloride-methyl acrylate-itaconic acid terpolymer, a vinylidene chloride-acrylonitrile-acrylic acid terpolymer, or a glycidyl(meth)acrylate polymer or copolymer. Other chemical adhesives, such as polymers, copolymers, reactive polymers or copolymers, which exhibit effective bonding between the ink-receptive layer and the support, are also useful. The polymeric binder in the subbing layer employed in the invention is preferably a water soluble or water dispersible polymer such as poly(vinyl alcohol), poly(vinyl pyrrolidone), gelatin, a cellulose ether, a poly(oxazoline), a poly(vinylacetamide), partially hydrolyzed poly(vinyl acetate/vinyl alcohol), poly(acrylic acid), poly(acrylamide), poly(alkylene oxide), a sulfonated or phosphonated polyester or polystyrene, casein, zein, albumin, chitin, chitosan, dextran, pectin, a collagen derivative, collodion, agar-agar, arrowroot, guar, carrageenan, tragacanth, xanthan, rhamsan and the like, a latex such as poly(styrene-co-butadiene), a polyurethane latex, a polyester latex, or a poly(acrylate), poly(methacrylate), poly(acrylamide) or copolymers thereof. However, the inventors are not aware of any water-based tie-layers 301 that are have been disclosed which are intended to work with water-based ink-receptive layers 401 comprising relatively high levels of divalent metal salts, such as those disclosed by Dannhauser and Campbell in U.S. Publication No. 2011/0279554 A1. It has been found by trial and error that certain types or classes of water-based tie layers 301 are suitable for use in combination with water-impermeable substrates 100 and a water-based ink-receptive layer 401 which contains a divalent metal salt. Preferred water-based tie-layers 301 employ polyvinyl alcohol, polyvinyl amine, gelatin, poly(ethyleneimine), epoxy resins, polyurethane, polyacrylamide, and derivatives, copolymers, and blends thereof, as a polymeric binder. Especially preferred are compositions containing a polymer or copolymer comprising 50 to 100 mole percent of glycidyl acrylate or glycidyl methacrylate monomer.

Although desirable for the water-based tie-layer 301 to be a single discrete layer, it can also comprise one or more water-based sub-layers, in cases where a single layer is less effective or where additional functionality is desired. Examples where the tie-layer is comprised of two sub-layers are disclosed in U.S. Pat. No. 5,380,586. Preferred first water-based tie-sub-layers, which are applied directly to a CDT-treated film surface, include poly(ethyleneimine) and epoxy resins modified with an acidified aminoethylated vinyl polymer, and the preferred second water-based tie-sub-layer, which is applied on top of the first sub-layer, is a cross-linked poly(vinyl alcohol) polymer.

Whether the water-based tie-layer 301 is comprised of a single layer or one or more sub-layers, the total dry coverage of the water-based tie-layer 301 is preferably from 0.05 to 12 g/m$^2$, more preferably from 0.05 to 8 g/m$^2$, more preferably from 0.05 to 3 g/m$^2$, and most preferably from 0.05 to 1.5 g/m$^2$.

In one embodiment, the water-based tie-layer 301 and the water-based ink-receptive layer 401 are applied in-line as part of the printing operation, wherein such layers are applied to a water-impermeable substrate 100 by one or more coating systems 300, 400 prior to printing as shown in FIG. 1. In another embodiment, the water-based tie-layer 301 and the water-based ink-receptive layer 401 are applied in-line as part of the substrate manufacturing process. In yet another embodiment, the water-based tie-layer 301 is applied in-line as part of the substrate manufacturing process, and the water-based ink-receptive layer 401 is applied in-line as part of the printing operation. In any of the above embodiments, the surface modification system 200 is preferably located in-line and just prior to Coating System A 300 used to apply the water-based tie-layer 301. In-line application of the water-based tie-layer 301 and the water-based ink-receptive layer 401 are performed by the various available coating applications methods, including but not limited to spray coating, rod coating, blade coating, gravure coating (direct, reverse, and offset), flexographic coating, extrusion hopper coating, slide-hopper coating, and curtain coating. Particularly preferred coating application methods for water-impermeable substrates permit for more than one layer to be deposited simultaneously, such as slide-hopper and curtain coating methods. With these types of coating application methods, both the water-based tie-layer 301, including any sub-layers, and the water-based ink-receptive layer 401 are applied simultaneously, saving both time and the cost of additional hardware. The curtain coating method has the added advantage that it is a non-contact application method, and the coated layer will conform to the surface of the substrate, which reduces coat weight variations on rough or textured surfaces. In another embodiment, Coating System A 300 or Coating System B 400 are in the form of a sprayable or jettable fluid deposition system. When a sprayable or jettable fluid deposition system is used to apply the water-based tie-layer 301 or the water-based ink-receptive layer 401, the option exists of covering only the area under the printed image with the water-based tie-layer 301 and the water-based ink-receptive layer 401, rather than the entire area of the water-impermeable substrate 100.

Regardless of the coating application system and configuration for Coating System A 300 and Coating System B 400, the water-based tie-layer 301 and the water-based ink-receptive layer 401 should be sufficiently dried prior to the deposition of the water-based pigment inks 500. By sufficiently dried, it is meant that any residual water after the drying process is within the normal ranges that are measured when the dried coated layers are equilibrated at an ambient environment condition of 20° C. to 30° C. and 20% to 80% relative humidity.

A key consideration in high speed production printing on a water-impermeable substrate 100 is the rate at which the ink drops are applied to the substrate. Ink-receptive layers comprising multivalent metal ions are particularly advantageous for high speed printing with page-wide ink jet arrays comprising anionically stabilized pigment inks, wherein adjacent drops of ink of the same color are deposited within a few microseconds of each other and drops of ink of a second color are deposited within a few milliseconds of the first color. More specifically, for a fixed array inkjet deposition system 600 depositing print drops on a substrate moving at 200 meters per minute and at an addressability of 900 drops per inch in the process direction, the time delay between successive drops of the same color placed on the substrate is a mere 8.5 microseconds, and the time delay between a drop of a second color deposited from a second fixed array inkjet deposition system 600 displaced 15.2 cm after the first array is 46 milliseconds. Therefore it is critical for optimum dot structure and minimal drop-to-drop coalescence and intercolor bleeding that the pigments in the water-based pigment ink 500 are immobilized almost instantaneously after they come in contact with the substrate. Because capillary absorption of the water and co-solvents in the ink is not available on a non-porous water-impermeable substrate 100, pigment immobilization is most efficiently be accomplished by employing the combination of an anionically dispersed pigment particle in the water-based pigment ink 100 and a multivalent metal salt with a hydrophilic polymer in the water-based ink-receptive layer 401. Although not desiring to be bound to a specific hypothesis, it is believed that the preferred multivalent metal cations, such as calcium and magnesium, can diffuse from the water-based ink-receptive layer 401 into the first water-based pigment ink layer 501 on the order of one microsecond or less, and further into a subsequent water-based pigment ink layers 601 on the order of 1 millisecond or less, rapidly forming ionic cross linkages with the anionically stabilized pigments, thereby immobilizing them.

The water-based ink-receptive layer 401 of the invention includes a water-soluble salt of a multivalent metal. Water-soluble is herein defined as at least 0.5 g of the salt capable of dissolving in 100 ml water at 20° C. The salt is preferably colorless and transparent when the water-based ink-receptive layer is coated and dried. More preferably, the multivalent metal is a cation selected from $Mg^{+2}$, $Ca^{+2}$, $Ba^{+2}$, $Zn^{+2}$, and $Al^{+3}$, and most preferably $Ca^{+2}$ or $Mg^{+2}$, in combination with suitable counter ions. Examples of the salt used in the invention include (but are not limited to) calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Similar salts will be appreciated by the skilled artisan. Particularly preferred salts are calcium chloride, calcium acetate, calcium nitrate, magnesium chloride, magnesium acetate, and magnesium nitrate, including hydrated versions of these salts. Combinations of the salts described above can also be used.

The water-based ink-receptive layer 401 can further include a hydrophilic polymer alone or in combination with one or more additional polymers. Such hydrophilic polymers include polymers capable of adsorbing water, and preferably are capable of forming a continuous phase solution with the multivalent metal salt. Non-exclusive examples of such materials include gelatin, starch, hydroxycelluloses, polyvinyl alcohol, polyvinyl pyrrolidone, polyethylene imine, polyvinyl amine, and derivatives of these materials. A preferred binder is an acetylacetate-modified polyvinyl alcohol obtained under the trade name Gohsefimer Z-320 from Nippon Gohsei. To provide an enhanced level of abrasion resistance and cohesiveness, the water-based ink-receptive layer 401 includes at least 0.05 g/m² of cross-linked hydrophilic polymer binder. The identity and amount of crosslinker will depend on the choice of hydrophilic polymer and its reactivity with the crosslinker, the number of crosslinking sites available, compatibility with other solution components, and manufacturing constraints such as solution pot life and coating drying speed. Non-exclusive examples of crosslinker materials are glyoxal, Cartabond TSI (Clariant), Cartabond EPI (Clariant), Sequarez 755 (Omnova), glutaraldehyde sodium bisulfate complex (Aldrich), Sunrez 700M (Omnova), Sunrez 700C (Omnova), CR-5L (Esprix), bis(vinyl) sulfone, bis(vinyl) sulfone methyl ether, adipoyl dihydrazide, epichlorohydrin polyamide resins and urea-formaldehyde resins. For food packaging applications, cross-linkers which do not contain impermissible levels of components or byproducts are most preferred. In a particular embodiment, the cross-linked hydrophilic polymer includes an acetylated polyvinyl alcohol polymer, cross-linked with a epichlorohydrin polyamide resin compound. In another preferred embodiment, a polyvinyl alcohol polymer (70-90% hydrolysis level) is reacted with glyoxal-containing resin.

Although use of a multivalent metal salt and hydrophilic polymeric binder in a water-based ink-receptive layer 401 in accordance with the above specifications itself has been found to provide advantageous performance, in further embodiments, the topmost layer can further comprise a polymer latex filler such as polyurethane latex, vinylacetate-ethylene copolymer latex, and styrene-acrylic latex polymer dispersions for improved water resistance and image durability. When present, however, the fraction of additional latex filler preferably does not exceed 75% of the total polymer in the topmost layer, to avoid undesired decrease in maximum density and increase in mottle upon printing with a water-based pigment ink 500.

The water-based ink-receptive layer 401 can further comprise additional optional components, such as inorganic or organic particles, as long as the coating solid lay down and concentration requirements of the multivalent metal salt are met. These can include, but are not limited to, kaolin clay, montmorillonite clay, delaminated kaolin clay, calcium carbonate, calcined clay, silica gel, fumed silica, colloidal silica, talc, wollastinite, fumed alumina, colloidal alumina, titanium dioxide, zeolites, or organic polymeric particles such as Dow HS3000NA. U.S. Publication No. 2013/0293647 A1 discloses a water-based ink-receptive layer 401 further comprising particles of specific size and hardness to prevent ink retransfer, the disclosure which is herein incorporated by reference. Examples of such particles polymer particles comprising, e.g., polyethylene, poly(tetrafluoroethylene), polypropylene, ethylene bis-stearamide, synthetic hydrocarbon waxes, carnauba wax, or a combination thereof. Similarly U.S. Publication No. 2014/0292951 A1 discloses a transparent water-based ink-receptive layer 401 further incorporating silica that is less than 200 nm in size to improve print quality and durability, the disclosure which is herein incorporated by reference.

In contrast to the recommendations for paper-based substrates provided in U.S. Publication No. 2011/0279554 A1, in the context of evaluating similar water-based ink-receptive layers 401 for use in combination with a water-based tie layer 301, inventors have discovered that the preferred concentrations, the preferred divalent metal salts, and the preferred coating coverages are different. For example, when water-based ink-receptive layers 401 that comprise multivalent metal salt concentrations or dry coverages in the preferred ranges as disclosed in U.S. Publication No. 2011/0279554 A1 are used in combination with the other preferred layers of the present invention to produce a laminated flexible film package, the final bond strength is adversely affected compared to water-based ink-receptive layers that comprise lower levels of salt or lower dry coverages, There is also a tendency for the water-based ink-receptive layer 401 and the water-based pigment inks to develop a hazy appearance when the concentration of the divalent metal salt in the dried coating is in the center of the preferred ranges as disclosed in U.S. Publication No. 2001/0279554 A1. Although not wishing to be bound to any particular hypothesis, the inventors note that unlike paper based substrates which are known to somewhat permeable to divalent metal ions such as calcium, magnesium, and the like, impermeable plastic substrates are essentially impermeable to metal ions. Therefore it stands to reason that a lower initial concentration of divalent metal ions are sufficient to immobilize the anionically stabilized pigment particles, and that higher concentrations of divalent metal ions can lead to phase-separation or crystallization, resulting in a hazy appearance and interfering with layer-to-layer adhesion. Based on further extensive investigation, the preferred dried water-based ink-receptive layers 401 for use with the other preferred layers and substrates of the present invention comprise between 0.05 and 1.0 g/m$^2$, more preferably between 0.1 and 0.8 g/m$^2$, most preferably between 0.2 and 0.5 g/m$^2$, of the hydrophilic polymer, and the weight ratio of the multivalent metal salt to the hydrophilic polymer in the water-based ink-receptive layer 401 is preferably between 2.5:1 and 0.75:1, inclusive. Further, due to drying limitations, the preferred wet coverage of the water-based ink-receptive layer 401 is less than 10 g/m$^2$, more preferably less than 5 g/m$^2$, still more preferably less than 3 g/m$^2$. Finally, in consideration of the contribution of the water-based ink-receptive layer 401 to the overall thickness and cost of the final multilayered structures useful for packaging and décor applications, the preferred dry coating coverage of the water-based ink-receptive layer is preferably from 0.05 to 1.5 g/m$^2$. In general, lower wet and dry coverages are preferred so long as the requirements for the dry multivalent salt coverage and hydrophilic binder polymer levels as defined above are met.

Another aspect of the invention is directed to a printing method in which the above-described substrate is printed with an inkjet deposition system 600 employing at least one anionically stabilized water-based pigment ink 500. The colorant systems of the water-based pigment ink 500 compositions employed in accordance with one embodiment of the invention are pigment-based or combinations of dye and pigment. Compositions incorporating pigment are particularly useful. Water-based pigment inks 500 are used because such inks render printed images having higher optical densities and better resistance to light and ozone as compared to printed images made from other types of colorants. A wide variety of organic and inorganic pigments, alone or in combination with additional pigments or dyes, are useful in the present invention. Pigments that are useful in the invention include those disclosed in, for example, U.S. Pat. Nos. 5,026,427; 5,141,556; and 5,160,370. The exact choice of pigments will depend upon the specific application and performance requirements such as color reproduction and image stability. Especially preferred colorants are anionically stabilized pigments.

Pigments suitable for use in the invention include, but are not limited to, azo pigments, monoazo pigments, di-azo pigments, azo pigment lakes, Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon black. Carbon black is preferable as a pigment for black ink. Other black pigments are also acceptable and be comprised of magnetic particles such as magnetite or ferrite, or titanium black also be used.

Typical examples of pigments that are useful include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

The water-based pigment inks 500 can comprise self-dispersing pigments that are dispersible and stable without the use of a polymeric or molecular dispersant or surfactant. Pigments of this type are generally those that have been subjected to a surface treatment such as oxidation/reduction, acid/base treatment, or functionalization through coupling chemistry so long as the charge on the surface is predominantly anionic or negative.

The pigment particles of the water-based pigment ink 500 preferably have a median particle diameter of less than 150 nm, more preferably less than 100 nm, and most preferably less than 50 nm as measured by laser light scattering methods. As used herein, median particle diameter refers to the 50th percentile of the classified particle size distribution such that 50% of the volume of the particles is provided by particles having diameters smaller than the indicated diameter. Particularly desirable pigment particle sizes are those that satisfy the particle Peclet number requirements for stable continuous ink jet fluid drop formation properties, as taught in WO 2009/044096 by Clarke, et al.

The pigments used in the ink composition of the invention be present in any effective amount, generally from 0.1 to 10% by weight, and preferably from 0.5 to 6% by weight. In one embodiment the weight ratio of the polymeric dispersant to the pigment is 0.15 to 0.9. In accordance with one embodiment of the invention, colorants comprising cyan, magenta, yellow, and black pigments are specifically employed.

Water-based pigment inks 500 employing non-self-dispersed pigments that are useful in the invention are prepared by any method known in the art of inkjet printing. Useful methods commonly involve two steps: (a) a dispersing or milling step to break up the pigment aggregate into primary particles, where primary particle is defined as the smallest identifiable subdivision in a particulate system, and (b) a dilution step in which the pigment dispersion from step (a) is diluted with the remaining ink components to give a working strength ink. The pigment milling step (a) be carried out using any type of grinding mill such as a stirred media mill, a ball mill, a two-roll mill, a three-roll mill, a bead mill, and air-jet mill, an attritor, a high speed disperser, a horizontal mill, or a liquid interaction chamber. In the milling step (a), pigments are optionally suspended in a medium, which is typically the same as, or similar to, the medium used to dilute the pigment dispersion in step (b). Inert milling media are optionally present in the milling step (a) in order to facilitate breakup of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b). Related milling, dispersing, grinding or comminution processes that are highly suitable to the practice of the invention are described in U.S. Pat. Nos. 5,478,705; 5,513, 805; 5,662,279; 5,679,138; 5,862,999; 5,985,071; and 6,600,559. A particularly preferred milling process is disclosed in U.S. Pat. No. 7,441,717, and its disclosure is herein incorporated by reference.

A dispersant is preferably present in the milling step (a) in order to facilitate breakup of the pigment agglomerate into primary particles. For the pigment dispersion obtained in step (a) or the ink composition obtained in step (b), the dispersant is present in order to maintain particle stability and to prevent particle aggregation followed by settling; the dispersant either be an amphiphilic molecular surfactant or a polymer. In addition to the dispersant, there be, optionally, additional dispersants or polymers present for use in the invention such as those commonly used in the art of ink jet printing. Anionic dispersants suitable for use in the invention in preparing stable pigment dispersions include, but are not limited to, those commonly used in the art of inkjet printing. For water-based pigment inks 500, particularly useful dispersants include anionic surfactants such as sodium dodecylsulfate, potassium oleylmethyltaurate, or sodium oleylmethyltaurate as described in, for example, in U.S. Pat. Nos. 5,679,138; 5,651,813; and 5,985,017.

Polymeric dispersants are also known and useful in water-based pigment inks 500. Polymeric dispersants include polymers such as homopolymers and copolymers; anionic, cationic or nonionic polymers; or random, block, branched or graft polymers. The copolymers are designed to act as dispersants for the pigment by virtue of the arrangement and proportions of hydrophobic and hydrophilic monomers. The pigment particles are colloidally stabilized by the dispersant and are referred to as polymer stabilized pigment dispersions. Polymeric dispersants have the additional advantage of offering improve print durability over non-polymeric dispersants once the water-based pigment inks 500 are dried down. In combination with preferred water-based ink-receptive layer 401, anionic polymeric dispersants are required. Preferred anionic copolymer dispersants are those where the hydrophilic monomer is selected from carboxylated monomers. Preferred anionic polymeric dispersants are copolymers prepared from at least one hydrophilic monomer that is an acrylic acid or methacrylic acid monomer, or combinations thereof. Preferably, the hydrophilic monomer is methacrylic acid. Particularly useful polymeric pigment dispersants are further described in U.S. Publication Nos. 2006/0012654 A1 and U.S. 2007/0043144 A1, the disclosures of which are incorporated herein by reference.

Pigment particles that are dispersed and stabilized by the preferred dispersants described above are considered anionically stabilized pigments, and water-based pigment inks 500 that comprise such pigments exhibit a negative zeta potential. Anionically stabilized water-based pigment inks 500 exhibit a zeta potential that is preferably less than (more negative than) −30 mV, more preferably less than −40 mV, most preferably less than −50 mV.

Water-based pigment inks 500 can contain further addenda as is conventional in the inkjet printing art. In addition to water as the principal vehicle or carrier medium and the anionically stabilized pigment particles, an inkjet ink composition for use in a continuous inkjet printer minimally contains humectant, biocide, and surfactant. The ink can further contain one or more types of other components, including and not limited to a film-forming binder, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal or antibacterial agent, a jetting aid, a filament length modifier, a trace of multivalent cationic flocculating salt, a solution conductivity control agent, or a compound for suppressing electrostatic deflection charge shorts when ink dries on the charge ribbon electrodes, if that mode of drop deflection is to be employed.

Preferred as film forming finders for applications requiring enhanced durability are aqueous dispersible acrylic latex polymers and aqueous dispersible or aqueous soluble polyurethane polymers of the types described in U.S. Publication No. 2012/0274685 A1, incorporated herein by reference. Depending on the specific application, other types of polymeric addenda are also useful, such as those described in U.S. Pat. No. 8,455,570, incorporated herein by reference. Particularly preferred polymeric addenda are polyurethanes of the types disclosed in U.S. Pat. No. 8,434,857, incorporated herein by reference.

Water-based pigment inks 500 suitable for use in particular embodiments of the present invention include those described, e.g., in co-pending, commonly assigned U.S. Publication No. 2011/0123714 A1, and in U.S. Pat. Nos. 8,173,215; 8,398,191; 8,419,176; and 8,455,570, the disclosures of which are incorporated by reference herein in their entireties.

Inkjet printing is a non-impact method for producing printed images by the deposition of ink drops in a pixel-by-pixel manner to an image-recording element in response to digital data signals. There are various methods that are useful to control the deposition of ink drops on the image-recording element to yield the desired printed image. In one process, known as drop-on-demand inkjet, individual ink drops are projected as needed onto the image-recording element to form the desired printed image. Common methods of controlling the projection of ink drops in drop-on-demand printing include piezoelectric transducers and thermal bubble formation. Drop-on-demand (DOD) drop generating devices have been known as inkjet deposition systems for many years. Early devices were based on piezoelectric actuators such as are disclosed in U.S. Pat. Nos. 3,946,398 and 3,747,120. A currently popular form of inkjet printing, thermal inkjet (or "thermal bubble jet"), uses electrically resistive heaters to produce vapor bubbles which cause drop emission, as is discussed in U.S. Pat. No. 4,296,421.

In another process, known as continuous inkjet, a continuous stream of drops is produced, and then individual drops are selected in an image-wise manner to be deposited onto the surface of the image-recording element, while un-imaged drops are caught and returned to an ink sump. Various schemes for generating and selecting ink drops are known in the art. Continuous inkjet deposition systems 600, which use a thermal pulse to produce ink drops of different sizes, and a stream of air to select drops to be printed from drops to be caught and recirculated, are especially preferred in view of their ability to print at speeds up to 900 meters per minute or greater. Suitable continuous inkjet deposition systems 600 are disclosed, e.g., in U.S. Pat. Nos. 6,588,888; 6,554,410; 6,682,182; 6,793,328; 6,863,385; 6,866,370; 6,575,566; and 6,517,197, herein incorporated by reference. As discussed in more detail below, a further benefit of continuous inkjet deposition systems in which the inks are continuously jetted and recirculated is that the water-based inks used in such systems require lower levels of organic co-solvents, such as a humectant, for reliable jetting as for similar inks used in DOD deposition systems.

Inkjet deposition systems 600 useful in the invention comprise a printer system capable of precisely depositing ink drops at predetermined locations on a moving substrate, at least one anionically stabilized water-based pigment ink 500 in accordance with the invention, and a surface-treated and coated water-impermeable substrate 100 suitable for receiving water-based pigment ink 500 from an inkjet deposition system 600. The printing method can employ a continuous high-speed commercial inkjet deposition system 600, for example, in which the printer applies different color inks from at least two different print heads, preferably full-width arrays with respect to the substrate, in sequence in which the different colored parts of the images are registered.

In accordance with an embodiment of the invention, after the anionically stabilized water-based pigment inks 500 are deposited with an inkjet deposition system 600 on a water-impermeable substrate 100 having a water-based tie-layer 301 and a water-based ink-receptive layer 401 coated successively thereupon, the one or more deposited water-based pigment ink layers 501 are dried by using a drying system 700. For the purpose of this invention, drying means the removal of the water from the deposited water-based pigment ink layer 501 to a point where the water-based pigment ink 500 no longer tracks off on any facing rollers or surfaces downstream from the final drier. Care should be taken not to heat the substrate above the temperature at which it begins to stretch and distort, including both the printed and unprinted areas. For thin, flexible films, such as those based on oriented polypropylene (OPP) or polyethylene (PE) used for packaging applications, the temperature of the film should be kept below about 60° C., preferably below about 50° C. When printing at high speeds, rapid evaporative drying, enhanced by application of heated, forced air flow across the surface of the print, is preferred. In that way, relatively heat sensitive substrates are printed and dried at high printing speeds without wrinkling or distortion.

As discussed briefly above, additional general considerations for drying of water-based inkjet inks on temperature sensitive water-impermeable substrates 100, are the types and amounts of any co-solvents used in the water-based pigment inks 500. On the one hand volatile, lower boiling co-solvents, which are readily and rapidly evaporated, are undesirable from a health and safety perspective, and also present problems with the reliability of the most inkjet deposition systems related to the drying out and crusting of ink around the jetting nozzles and other surfaces within the fluid delivery system. On the other hand, the inclusion of some amount of higher boiling water-miscible co-solvents, also known as "humectants," is well-known in the art, and desirable to enhance the reliability of the inkjet deposition systems by preventing the premature ink drying around the jetting nozzles as mentioned above. However, since higher boiling co-solvents are even more difficult to remove from the ink layer by evaporation than water, and since the water-impermeable substrate 100, the water-based tie layer 301, and the water-based ink-receptive layer as disclosed above have a limited capacity to absorb any residual higher boiling co-solvent, it is also desirable to keep the concentrations of higher boiling co-solvents as low as possible while not compromising the reliability of the inkjet deposition system. In the context of the present invention, "lower boiling co-solvent" refers to any water-miscible co-solvent that has a boiling point lower that 100° C., and "higher boiling co-solvent" refers to any water-miscible co-solvent that has a boiling point higher than 100° C.

The water-based pigment inks 500 of the invention further can include one or more water-soluble or polar organic compounds to serve as a humectant if desired in order to provide useful properties to the inkjet ink. Typical useful properties of humectant and co-solvent additives include, but are not limited to, preventing the ink composition from drying out or crusting in the nozzles of the printhead by reducing the rate of water evaporation and plasticizing the pigment cake as the ink dries; aiding the solubility of the components in the ink composition; facilitating redispersion of concentrated or dried ink in ink or CIJ cleaning fluid; modifying the fluid surface tension either directly (e.g., by reducing the chemical activity of water and surface energy at the liquid-solid or liquid-gas interface) or indirectly (e.g., by modifying the availability of surfactant in an aqueous phase); altering the fluid viscosity; aiding firing properties of the ink from an ejector; facilitating penetration of the ink composition into the image-recording element after printing; aiding gloss; and suppressing mechanical artifacts such as paper cockle and curl during and after printing.

Any water-soluble humectant or co-solvent known in the inkjet art and compatible with the other requirements of the invention are useful. By water-soluble is meant that a mixture of the employed humectant(s) or co-solvent(s) and water is adequately homogeneous and not subject to spontaneous phase separation. Although an individual humectant or co-solvent is useful, inkjet ink compositions can employ mixtures of two, three or more humectants and co-solvents, each of which imparts a useful property to the inkjet ink. As used herein in reference to inkjet ink compositions for use in a continuous ink jet printer, particularly desirable ingredients serving primarily as a humectant to retard ink drying and aid ink redispersability include glycerol, ethylene glycol, related polyols, and the polyhydric alcohol derivatives thereof, which are preferred; glycerol is especially preferred. The polyhydric alcohol derivatives of glycerol include the glycerol ethoxides, glycerol propoxides and glyceryths. It is recognized that the effectiveness of the humectant in accomplishing water retention and wetting will depend on its chemical structure.

Although any quantity of water soluble humectants and polar co-solvents either singly or in combination with dynamic surface tension reducing co-solvents and surfactants are useful, the total humectant and co-solvent level of the ink jet ink composition for continuous ink jet printing is desirably from about 1 to about 15% by weight and more preferably less than 10% by weight. The total humectant and co-solvent level of the ink is the sum of the individual contributions of humectant or miscible polar organic co-solvent, DST-modifying co-solvent (solvosurfactant), and any other co-solvent ingredients, which include humectant or organic co-solvent added directly or incidentally during the totality of ink formulation (for example, co-solvent associated with a commercial biocide preparation as a supplemental ingredient, or with a commercial pigment dispersion preparation that be present to prevent so-called "paint-flakes" of dried pigment cake forming around a bottle cap, as described in U.S. Publication No. 2005/0075415). More desirably, the total humectant and co-solvent level is less than or equal to about 10% by weight and yet more desirably less than or equal to about 8% by weight, in order to facilitate drying of the deposited ink layers in a high speed printer, and at least about 2%, and more preferably at least about 4% by weight, to encourage higher equilibrium moisture content in partially dried inks on printing system hardware to make them easier to redisperse and clean-up by fresh ink, by maintenance fluids, or by a printhead storage fluid.

In consideration of these constraints, the continuous inkjet depositions systems disclosed by reference above, which produce a continuous stream of drops and deflect the drops in an image-wise manner onto the surface of the image-recording element, while un-imaged drops are caught and recirculated back to an ink sump have been shown to operate reliably using water-based pigment inks 500 with levels of organic co-solvents less than 10 wt %, and in other cases less than 5 wt %. Therefore the preferred water-based pigment inks 500 of the invention contain less than 10 wt % co-solvents, even more preferably less than 8 wt % co-solvents, and most preferably less than 5 wt % co-solvents. Especially preferred water-based pigment ink 500 compositions and continuous inkjet deposition systems 600 are disclosed in more detail in U.S. Pat. No. 8,455,570, the disclosures of which are herein incorporated by reference.

As a reference, the water-based inks that are used in common thermal DOD inkjet writing systems, such as those manufactured by Eastman Kodak and included in the 10-series color cartridge for a range of desktop inkjet printers comprise 12 wt % water or more of miscible co-solvents. Other manufacturer's thermal DOD inkjet inks comprise as much as 20 wt % or more of water miscible co-solvents. Some water-based piezo DOD inks comprise greater than 50 wt % water miscible co-solvents. As will be shown in the Examples below, DOD inks with co-solvent levels even as low as 12 wt % remain tacky for extended periods of time when printed on water impermeable substrates that have been treated and pre-coated with the preferred materials and methods of the present invention. In view of the above considerations, it was surprising and unexpected that the preferred method of printing with water-based inks on water-impermeable substrates would in fact favor inks with higher, rather than lower levels of water compared to co-solvents.

After the water-based pigment inks 500 have been deposited onto the treated and coated water-impermeable substrate 100 to form a dried water-based pigment ink layer 501, the multi-layered article is optionally conditioned with moisture and heat using a conditioning chamber or oven 800. The application of moisture and heat has been found to greatly improve both the cohesive strength of the water-based pigment ink layer 501, and in combination with the water-based ink-receptive layer 401 of the current invention, the overall adhesion to the underlying substrate. Methods for conditioning anionically stabilized water-based pigment ink layers 501 that are deposited on water-based ink-receptive layers 401 comprising multivalent metal ions are disclosed in copending U.S. application Ser. No. 14/302,866 the details of which are herein incorporated by reference.

In a further embodiment of the present invention, the treated, coated, and printed water-impermeable substrate 100 is passed through a post-print application system 900 which applies either a solventless or water-based post-print functional layer 901. By "post-print functional layer" it is meant a layer which provides one of more of the following functions: (A) opacity, for example, when the water-impermeable substrate 100 is transparent; (B) protection of the treated, coated, and printed layers against environmental and physical stresses, such as wet and dry abrasion resistance, fade resistance, delamination resistance, and the like; and (C) adhesion, in applications such as flexible laminated packaging, wherein it is desired to bond a separate film or paper layer to the treated, coated, and printed layers. In keeping with the objectives of the present invention, the post-print functional layers should be free of organic solvents and UV-curable sensitizers, initiators, monomers, and oligomers. Not only are water-based post-print functional layers 901 preferred from an environmental perspective, inventors have found quite unexpectedly that compared to functionally analogous solventless and solvent-based formulations, the overall bond strengths of the final multi-layered structures are superior when certain combinations of water-based post-print functional layers are used. The post-print functions and compositions disclosed herein are intended to be illustrative but not limiting.

When opacity is a required function, such as when water-based pigment inks 500 are deposited on a treated and coated water-impermeable substrate 100 that is transparent or translucent, a white layer is preferred, although for certain applications, black or colored opaque layers can also be used. Any known opaque water-based ink, coating fluid, or paint composition are useful to provide opacity. Examples of water-based post-print opacifying layers include water-based white flexographic ink compositions, for example water-based white flexographic inks sold under the trade names WB Msquared and Bianco Base 100 by Sun Chemical Corporation, and Flint Group Water HMJ 90104. In another embodiment, any of the commercially available water-based latex paints can also be used to provide an opacifying layer. Especially preferred is the WB Msquared water-based white ink which contains a polyurethane binder.

When print protection is the required function, any of the available water-based overprint varnishes are flood coated over the printed multilayer structure. Preferred examples include water-based varnishes such as Haut Brilliant 17-6040327-7 (Siegwerk) and Michael Huber München 877801 Varnish Anitcurling. Examples of water-based adhesives useful for laminated packaging applications are the Dow Robond acrylic adhesives L90M, L-148, and L330, use in combination with CR 9-101 cross linker. Especially preferred is the Dow Aqualam polyurethane water-based adhesive, in combination with CR7-103 cross linker.

Although the post-print functional layers are cited separately above, for certain applications it is advantageous to combine the functions into a single layer, or to combine the post-print functional layer 901 with other structural layers. For example, an opaque adhesive layer is useful to adhere a treated, coated, and printed substrate to another water-impermeable transparent film to create a final multi-layered package or label. Alternatively, a clear adhesive layer is used to adhere a treated, coated, and printed water-impermeable substrate to an opaque film or paper layer to create a final multi-layered package or label. Opaque water-based protective overprint varnishes or opaque solventless laminates are another embodiment which combines two functions into one layer.

When the post-print functional layer 901 is water-based, it is applied using any of the same methods listed above in the context of the water-based tie-layer 301 and the water-based ink-receptive layer 401, including conventional analog coating processes and digital deposition systems. The layer is applied as a flood coating across the entire surface of the treated, coated, and printed substrate, or it is applied in a pattern-wise or image-wise fashion. When the post-print functional layer 901 is solventless, it is applied using a melt extrusion process wherein the molten or viscous solventless composition is extruded as a continuous layer over the surface of the dried water-based pigment ink layer 501 and any exposed water-based ink-receptive layer 401. Following the melt-extrusion process the post-print function layer 901 is further processed with heat and pressure to improve the adhesion followed by cooling to solidify the layer. In some cases the solventless composition is a two-part reactive composition intended to serve as an adhesive to which a continuous protective layer of paper or plastic is laminated with heat or pressure.

The following examples illustrate, but do not limit, the utility of the present invention.

EXAMPLES

1. Comparative. A range of commercially available, unprimed impermeable polyolefin film substrates were obtained from several suppliers. The surface energies of these films were estimated by using a set of "dyne pens" (Accudyne Test Marker Pens, Diversified Enterprises, Claremont, N.H.). These films were printed with an anionically stabilized water-based pigment ink (KODAK PROSPER Press packaging black ink) using a KODAK STREAM continuous inkjet printing apparatus. This ink has a static surface tension of 38 dyn/cm, and contains 8.5 wt % glycerol as a co-solvent/humectant. A test image containing patches from 0 to 100% ink coverage in 10% increments was printed ("step wedge"). Another set of these same films were surface treated with a corona discharge treatment apparatus, the surface energies were re-measured, and the films were printed in the same manner. The films were air-dried overnight, but remained slightly tacky for several days. A final dry at 60° C. for 2 hour was done, leaving only the higher tint levels (>70% coverage) still somewhat tacky.

Figure 3:
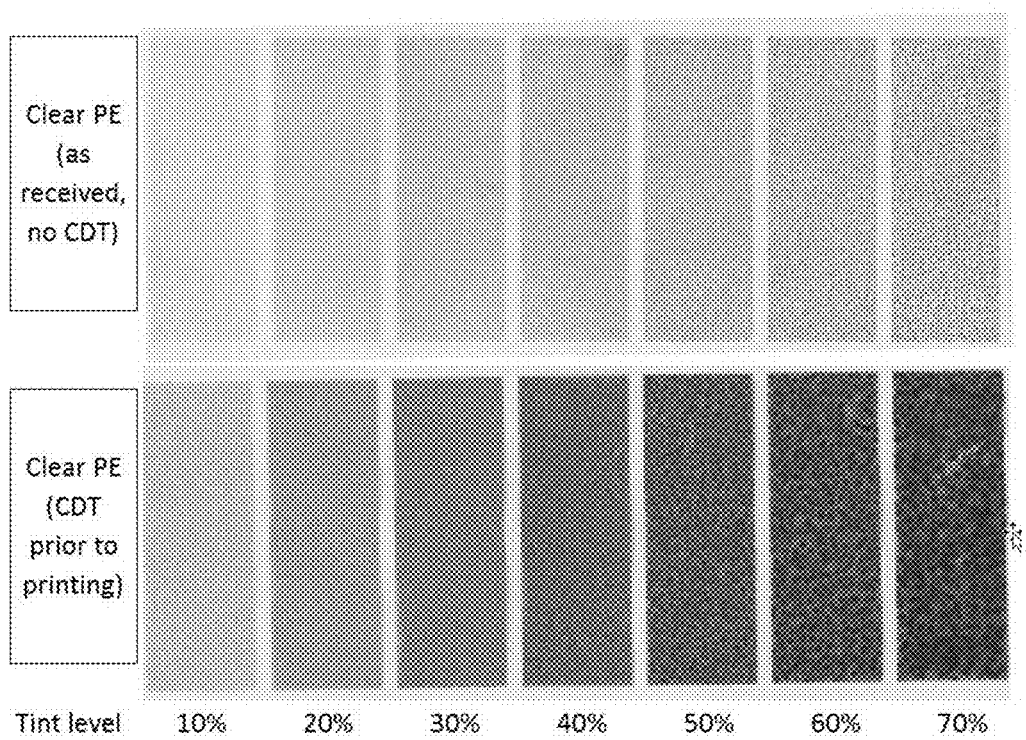
FIG. 3 shows a comparison of printed PE films, with and without CDT, which illustrates the differences in ink spreading and dot structure.

The printed samples were evaluated for print quality and adhesion as a function of surface energy, with and without CDT. Print quality was evaluated visually and by measuring the optical densities and the diameters of individual ink spots on the printed samples in the 10% coverage patch of each sample. Spot size was measured using a handheld image analyzer (QEA PIAS) with a specified 50% threshold. The non-CDT'ed samples in general show very little ink spread, and they exhibit smaller dot diameters and lower optical densities as result of poor wetting and spreading of the ink. On the other hand, the CDT'ed samples show much improved ink wetting and spreading; however, at the higher ink coverages excessive ink spreading leads to drops merging into one another, resulting in high levels of grain and mottle. A comparison of the printed PE films with and without CDT, which illustrates the difference in ink spreading and dot structure is shown in FIG. 3. Adhesion was assessed using a tape test designed to assess both the adhesion of the ink to the substrate as well as the cohesive strength of the dried ink layer. A 63.5 mm by 12.7 mm strip of Scotch Transparent Tape, Cat. 600, (3M Corporation), was applied to a test print resting on a solid counter top using 4-6 passes of firm pressure applied to the tape with one's thumb in a white cotton glove. The tape was then peeled slowly away from the specimen over 6-8 seconds at a 90° angle. Both the tape and print surface were visually inspected for evidence of transfer of ink from the print surface to the tape, and the results were ranked using the following 0-3 scale:

0 Less than or equal to 10% ink removal
1 Greater than 10% but less than 50% ink removal
2 Greater than 50% but less than 75% ink removal
3 Greater than 75% ink removal The results are summarized in the following table.

| Example | Film type* | Supplier | Surface Energy (as received) (dyn/cm) | Dot Diameter (no CDT) (um) | Ink Adhesion Ranking | Surface Energy (with CDT) (dyn/cm) | Dot Diameter (with CDT) (um) | Ink Adhesion Ranking |
|---|---|---|---|---|---|---|---|---|
| 1A | Clear BOPP | Taghleef | 44 | 55 | 0 | 60 | 58 | 0 |
| 1B | Clear BOPP | Taghleef | 42 | 42 | 0 | 58 | 62 | 0 |
| 1C | White BOPP | Taghleef | 42 | 42 | 1 | 48 | 59 | 0 |
| 1D | Clear PE | Superpac | 30 | 31 | 3 | 38 | 51 | 1 |

*BOPP = biaxially oriented polypropylene; PE = polyethylene.

The results of Example 1 indicate that improved wetting, adhesion, and optical density are obtained when an anionically stabilized water-based pigment ink is printed on a water-impermeable substrate for which the surface energy of the water-impermeable substrate is increased by use of a corona discharge treatment process. However, as shown in FIG. 3, the overall image quality suffers from the fact that the colorant is sufficiently mobile after printing but before drying that neighboring drops tend to merge and coalesce. Furthermore, areas of the CDT'ed and printed films that are greater than about 70% coverage remain tacky and do not completely dry to the touch.

Figure 4:
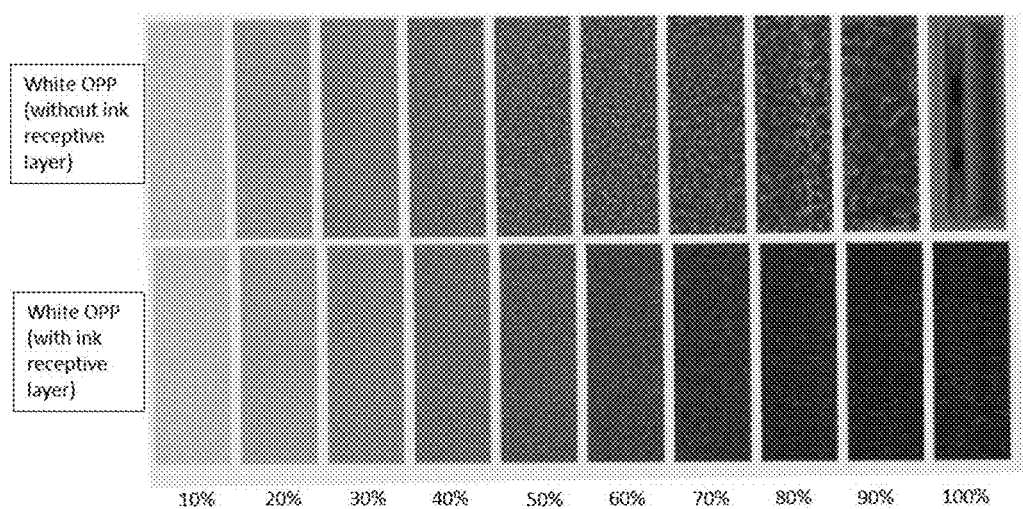
FIG. 4 shows a comparison of printed white OPP films, with and without ink receptive layer, which illustrates the differences in ink spreading and dot structure.

2. Comparative. To this same set of films was applied a water-based ink-receptive layer. A solution comprising 50 parts polyvinyl alcohol polymer (Gohsenol GH17, Nippon Gohsei), 20 parts anhydrous $CaCl_2$, 2.5 parts Cartabond TSI cross linker (Clariant), and 2 parts Lanco PTFE wax particles (Lubrizol) was prepared in water containing 0.08% Dynol 604 surfactant (Air Products) and Surfynol DF178 anti-foamant (Air Products) at 7.43% total solids content. The solution was applied using the drawdown method and dried to give a dry coverage of 0.5 g/m². Prior to the coating station, the films were treated with a corona discharge. In every case, the CDT'ed films samples showed effective wetting resulting in a continuous and uniform coating when dried. The CDT'ed and coated films were printed in the same manner as described above. The printed films were permitted to dry on the bench top overnight, and were found to be dry to the touch the following day. The resulting step wedges were observed to be uniform and artifact-free across the entire tone scale, as shown in FIG. 4. However, when the adhesion of the coated and printed films was evaluated using the tape test described in Example 1, the printed image was readily removed from the surface of each of the different films. This shows that water-impermeable substrates that have been CDT'ed and coated with a water-based ink-receptive layer can enable tack- and artifact-free images, but still suffer from poor adhesion to the underlying water-impermeable substrate.

3. This example shows that a water-based tie-layer greatly improves the adhesion of a water-based ink-receptive layer when coated over a corona discharge treated impermeable plastic substrate comprising uncoated, clear, oriented polypropylene.

Comparative Example 3A

No Tie-Layer

The ink-receptive layer used in Example 2 was applied to a 2-mil thick, clear, oriented polypropylene film (ExxonMobil) using a reverse gravure coating technique. Prior to the coating station, the film was treated with a corona discharge such that effective wetting of the coating fluid to the film was achieved. After drying, the resulting coating was smooth and uniform with a coat weight of approximately 0.85 g/m$^2$. For this example, the dry coat weight of $CaCl_2$, was approximately 220 mg/m$^2$, and the ratio of $CaCl_2$ to cross-linked hydrophilic polymer is 0.38.

The coated film was printed with anionically stabilized pigment inks identical to those disclosed in U.S. Pat. No. 8,455,570 using Kodak Stream continuous inkjet print heads. A test image containing patches from 0 to 100% ink coverage in 10% increments was printed with cyan ink. The test image was air-dried under ambient conditions for 24 hours and all color patches were found to be dry to the touch. This was analyzed for density and uniformity (ISO 13660 grain and mottle using 37-um and 411-um tile sizes, respectively) using a handheld image analyzer (QEA PIAS). The durability and integrity of the prints was tested by the tape test described in Example 1 over solid color patches of cyan, magenta, yellow, red (magenta plus yellow), green (cyan plus yellow), blue (cyan plus magenta), and neutral (cyan plus magenta plus yellow). The transfer of ink and coating to the tape was evaluated as a measure of the cohesive and adhesive strength of the printed film assembly.

Inventive Example 3B

Water-Based Tie-Layer

The same materials and procedures of Example 3A were used, except for the use of Bicor 84AOH OPP film (ExxonMobil) instead of the plain, uncoated 2-mil OPP film. The Bicor OPP film is 0.84 mil (21 um) thick, and comprises a water-based tie-layer, approximately 0.4-um thick, on one surface. The water-based tie-layer composition further comprises two sub-layers as disclosed in U.S. Pat. No. 5,380,586, with the outermost layer comprising a cross-linked polyvinyl alcohol. The water-based ink-receptive layer described above in Example 3A was coated over this layer and dried. The resulting ink-receptive layer was again smooth and uniform with a similar coat weight as Example 3A.

The inventive example 3B was printed and tested as described above for Example 3A. The test image was air-dried under ambient conditions for 24 hours and all color patches were found to be dry to the touch. The results are summarized in the following table.

| Example | Film support | Cyan Dmax | Cyan Grain | Cyan Mottle | Tape peel test |
|---|---|---|---|---|---|
| 3A | OPP | 1.36 | 8.9 | 5.4 | Complete adhesive failure: coating and ink removed from film base. |
| 3B | OPP + water-based tie-layer | 1.42 | 9.3 | 5.1 | Slight cohesive failure of ink only. |

Both samples exhibit similar print density and uniformity, and are much improved over Examples 1 and 2 above. Despite corona treatment of the OPP film, the adhesive strength of the water-based ink-receptive coating applied to Example 3A was insufficient to withstand the forces produced by the tape peel test. In contrast, the inventive Example 3B print shows dramatically improved tape peel durability.

4. This example shows that when water-based anionically stabilized pigment inks contain more than about 10 wt % of water miscible co-solvents, they become increasingly more difficult to dry.

A water-impermeable substrate comprising a water-based tie-layer and a water-based ink-receptive layer similar to that described in Examples 3B was used for this experiment. For this example, $MgCl_2$ was used as the divalent metal salt in the water-based ink-receptive layer. These coated films were printed with the following water-based anionically stabilized pigment ink sets and printing systems:

A. Kodak PROSPER Press pigment inks using a Kodak Stream continuous inkjet printing fixture as described above.
  B. Kodak thermal DOD pigment inks (10 Series cartridge) using a Kodak EasyShare 5500 inkjet printer.
  C. Epson piezo DOD pigment inks (220 cartridge) using an Epson XP-420 inkjet printer.

Test images containing patches from 0 to 100% ink coverage in 10% increments with cyan, magenta, yellow and black pigment inks as well as secondary colors red, green and blue comprising the appropriate combinations of primary cyan, magenta, and yellow inks, and a 3-color neutral comprising equal amounts of all three primary inks. Each print was tested for dryness by testing for ink transfer to bond paper pressed against the surface of the print using a weighted metal roller. When there was very faint or no transfer to the bond paper, the dry time was recorded, and the samples were further evaluated for smudge/smear of the image by periodically rubbing the print with a gloved finger and evaluated the degree of the ink smear (1=none, 3=poor). The ratings for all 8 colors were summed, and the results are summarized in the following table.

| Example | Type | Co-solvent Level* (wt %) | Dry Time (minutes) | Smudge/Smear Rating** |
|---|---|---|---|---|
| 4A | Inventive | 6.0 | 3.0 | 9.5 |
| 4B | Comparative | 12 | 60 | 12.3 |
| 4C | Comparative | 23 | 1440 | 15.4 |

*wt % of all co-solvents averaged across the cyan, magenta, yellow, and black inks.
**Measured four hours after printing.

5. This example shows that a non-porous, pigment-free water-based ink-receptive layer can provide comparable image quality at one-tenth of the coverage of a porous ink-receptive layer.

Comparative Example 5A

Porous Ink-Receptive Layer

A solution was made by adding 400 parts boehmite alumina (Dispal 18N4-80, Evonik), 50 parts polyvinyl alcohol (Gohsenol GH-23, Nippon Gohsei), 16 parts anhydrous $CaCl_2$ (Dow Chemical), and 0.75 parts 2,3-dihydroxy-1,4-dioxane to water containing 0.2% 10G surfactant (p-isononylphenoxypoly(glycidol)) to yield a solution containing 10% total solids content. This solution was coated using a reverse gravure technique on Bicor 84AOH OPP film (Exxon Mobil) over the side coated with polyvinylalcohol as described for Example 3B above at a wet coverage of approximately 50 g/m². After drying, the resulting coating has a dry coverage of approximately 5 g/m² and is transparent and colorless.

Inventive Example 5B

Non-Porous Ink-Receptive Layer

A solution comprising 50 parts acetylacetonate-modified polyvinyl alcohol (Gohsfimer Z320, Nippon Gohsei), 10 parts anhydrous $CaCl_2$ (Dow Chemical), 0.25 parts Cartabond TSI (Clariant), and 1 part Lanco 1799 PTFE wax particles (Lubrizol) was prepared in water containing 10G surfactant (p-isononylphenoxypoly(glycidol)) to yield a solution containing 10% total solids content. This solution was coated using a reverse gravure technique on Bicor 84AOH OPP film (Exxon Mobil) over the side coated with polyvinylalcohol, but used a gravure cylinder with a fluid capacity ~1/10th that used for sample 4a. After drying, the resulting coating has a dry coverage of approximately 0.5 g/m² and is transparent and colorless.

The comparative and inventive coated films were printed with water-based anionically stabilized pigment ink in the same manner as described in Examples 3A and 3B. The test image containing patches from 0 to 100% ink coverage in 10% increments with cyan, magenta, yellow and black pigment inks. The test image was air-dried under ambient conditions for 24 hours and all color patches were found to be dry to the touch. This test image was analyzed for density and uniformity (ISO 13660 grain and mottle using 37-um and 411-um tile sizes, respectively) using a handheld image analyzer (QEA PIAS).

The table below summarizes the density, grain, and mottle measurements made on the cyan step wedge printed on Examples 5A and 5B. For this example, grain and mottle values were summed over the ten different ink coverage patches.

| Example | Type | Wet Coverage (g/m²) | Dry Coverage (g/m²) | Cyan $D_{max}$ | Sum L(CIE) Grain | Sum L(CIE) Mottle |
|---|---|---|---|---|---|---|
| 5A | Comparative | 50 | 5 | 1.43 | 11.8 | 5.5 |
| 5B | Inventive | 5 | 0.5 | 1.46 | 11.8 | 4.8 |

Despite the inventive sample 5B having a dry coverage that is only 1/10$^{th}$ that of the comparative porous coating 5A, the prints made on the two coated films have comparable print densities and uniformity (grain, mottle). Similar results were obtained for test prints made with magenta, yellow, and black anionically stabilized water-based pigment inks. Inventive Example 5B is advantaged over comparative Example 5A by the dramatically reduced wet and dry coverages, which in turn reduce the time and energy required to dry it as well as the resultant cost of the coating.

6. A series of aqueous solutions were prepared comprising $CaCl_2$ salt, polyvinyl alcohol polymer (Gohsenol GH-17, Nippon Gohsei), and Cartabond TSI crosslinker (Clariant). These were coated on a corona-treated polyester film (Transpet CT1-F, Transilwrap). The film does not adsorb water or the above solutions, and is thus defined as impermeable. The coatings were made on a MiniLabo (Mirwec) reverse gravure coating machine at a wet coverage of approximately 8 g/m². By varying concentrations of $CaCl_2$ and polymer in solution, coatings were obtained with dry coverages summarized in the following table.

The coated films were printed were printed with water-based anionically stabilized pigment ink in the same manner as described in Examples 3A and 3B. A target including patches of sequentially increasing laydowns (increments of 10% maximum cyan ink laydown) was printed and air-dried before being analyzed for density and uniformity in the same manner as described in Examples 5A and 5B. The mottle values measured for the ten steps of each print were summed and are listed in following table. These summed values are consistent with the visually observed uniformity of the prints.

A second target including patches of black ink printed over cyan, magenta, and yellow patches was also produced. After air drying for ~3-4 hours, the ink was dry to the touch, and these printed patches were tested for dry rub abrasion resistance using a Sutherland rub tester (ISO 18947; 4-lb weight, 10 cycles, bond paper receptor). The densitometry of the patches was measured before and after rub testing; the % retained visual density after the rub test was calculated for the black over yellow, black over magenta, and black over cyan prints on each coating. These three measurements were then averaged and are reported in the following table as the dry rub for that coating.

| Example | $CaCl_2$ (g/m²) | GH-17 (g/m²) | Sum L* Mottle | % $D_{vis}$ Retained |
|---|---|---|---|---|
| 6A | 0.38 | 0.11 | 6.44 | 11% |
| 6B | 0.22 | 0.22 | 5.37 | 37% |
| 6C | 0.54 | 0.22 | 4.90 | 65% |
| 6D | 0.11 | 0.38 | 4.78 | 39% |
| 6E | 0.38 | 0.38 | 4.63 | 64% |
| 6F | 0.65 | 0.38 | 4.53 | 86% |
| 6G | 0.54 | 0.54 | 4.47 | 69% |
| 6H | 0.38 | 0.65 | 4.45 | 75% |

Figure 5:
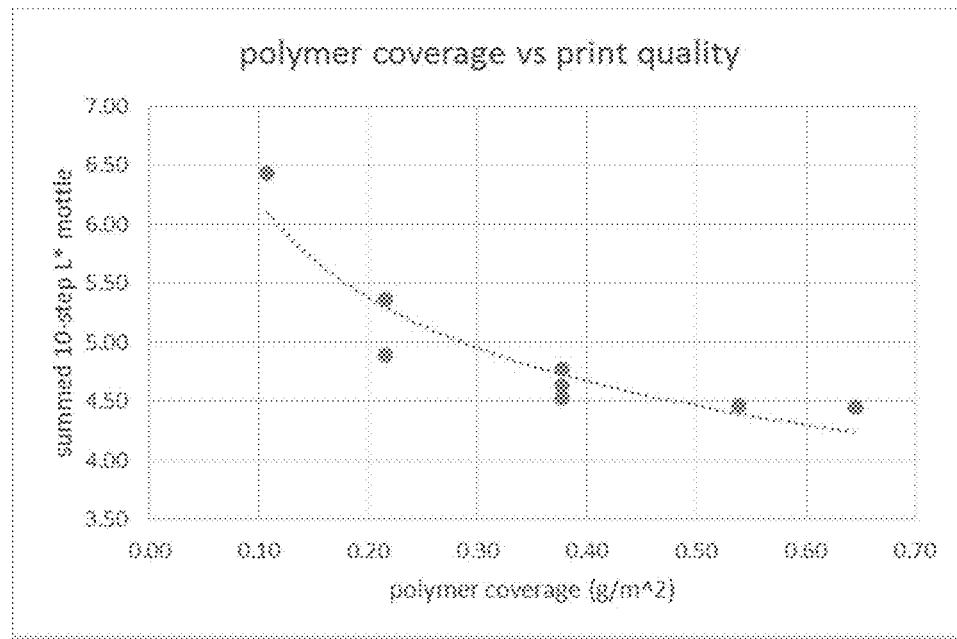
FIG. 5 is a plot of Sum L* Mottle as a function of polymer dry coverage in $g/m^2$.
Figure 6:
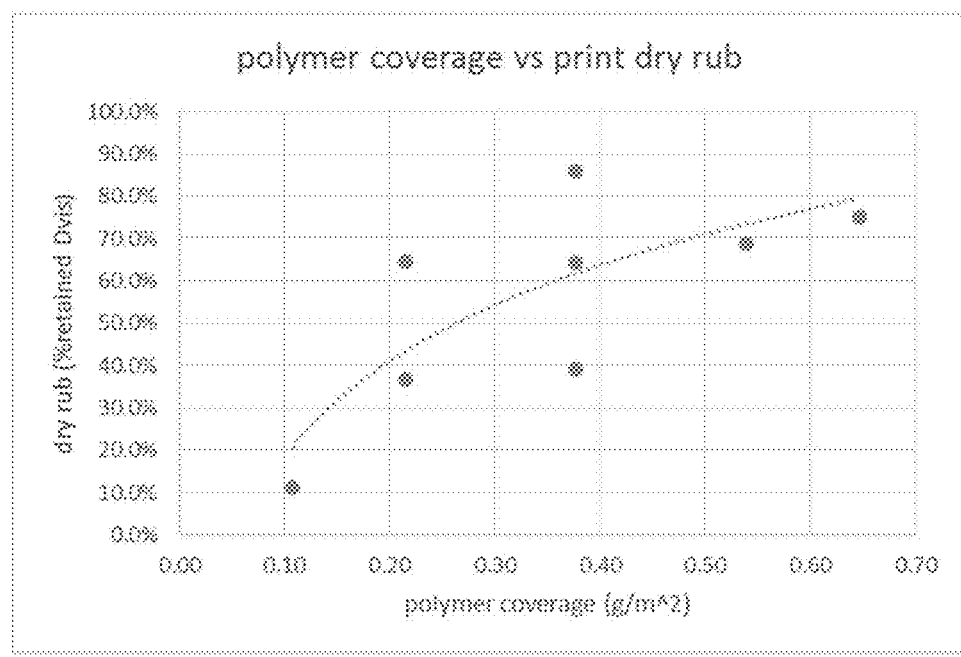
FIG. 6 is a plot of % retained visible density ($D_{vis}$) as a function of polymer dry coverage in $g/m^2$.

Print quality improves (Sum L* mottle decreases) as the dry coverage of GH-17 polymer increases, as seen in FIG. 5. Furthermore, as the dry coverage of GH-17 polymer increases, the resistance of the print to dry rub abrasion also improves, as indicated by higher values of visual density retained after the Sutherland rub test described above. This trend is visible FIG. 6. Therefore, based on print quality and print dry rub resistance, it is preferred that the polymer dry coverage in the ink-receptive coating layer on a water-impermeable substrate be greater than 0.22 g/m², and more preferably greater than 0.38 g/m². The maximum polymer dry coverage should not exceed 0.65 g/m².

Figure 7:
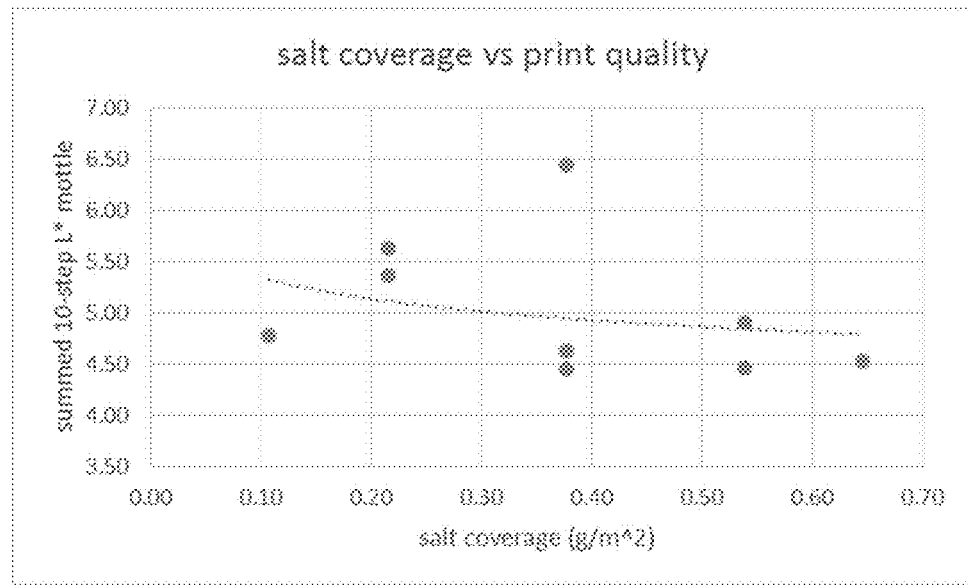
FIG. 7 is a plot of Sum L* mottle as a function of the salt dry coverage in $g/m^2$.

FIG. 7 demonstrates that increasing dry coverages of salt in the ink-receptive coating layer applied to a water-impermeable substrate results in only slightly improved print quality (decreased mottle). In contrast to paper substrates, the divalent metal ions are unable to diffuse away from the ink-receptive layer into the impermeable substrate; therefore, relatively low salt laydowns (0.1-0.2 g/m$^2$) can produce acceptable image quality.

Figure 8:
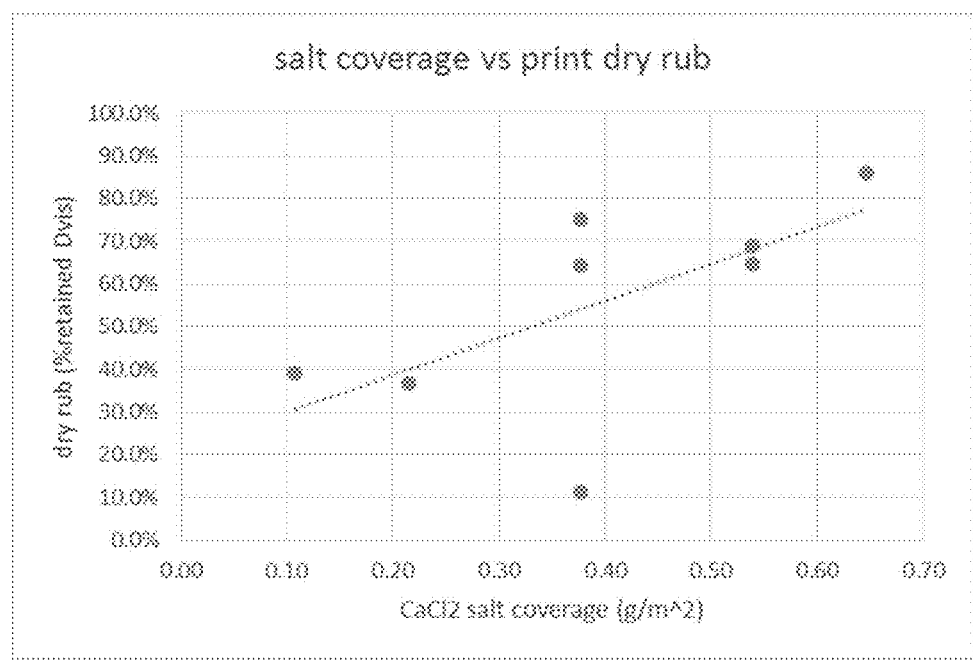
FIG. 8 is a plot of % retained visible density ($D_{vis}$) as a function of salt dry coverage in $g/m^2$.
Figure 9:
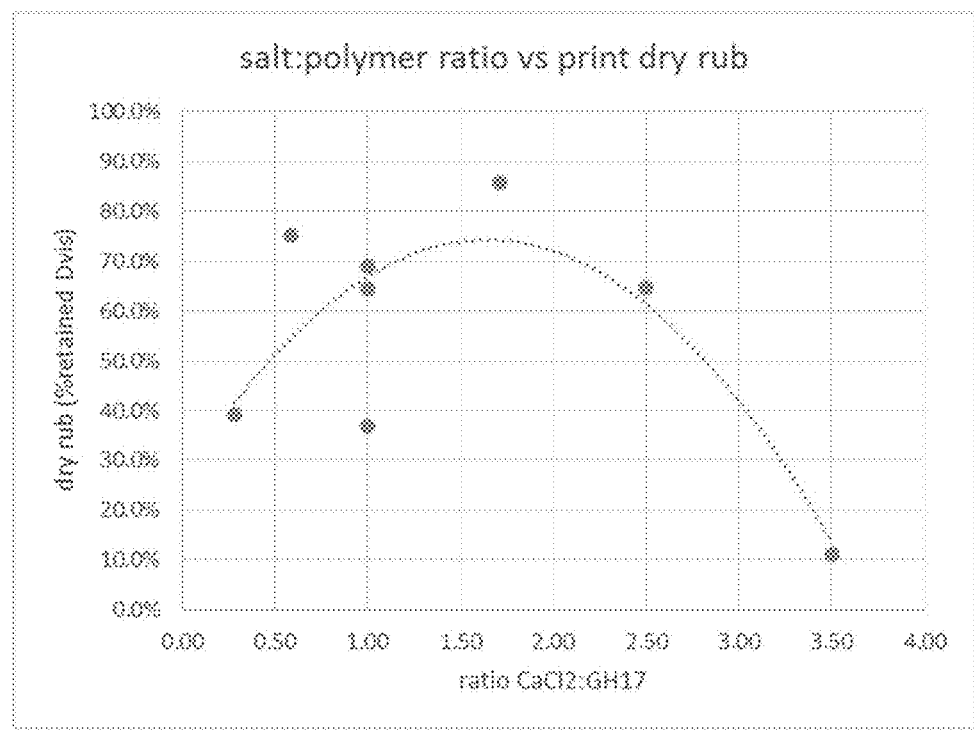
FIG. 9 is a plot of % retained visible density ($D_{vis}$) as a function of the salt-to-polymer weight ratio in the dried coating.

Independent of the polymer dry coverage, it was unexpectedly found that increasing the dry coverage of $CaCl_2$ improves print dry rub resistance, as illustrated in FIG. 8. However, the dry rub performance for a given salt coverage is also strongly dependent on the polymer content of that coating, as shown in FIG. 9, in which the dry rub response is plotted as a function of the ratio of salt to polymer in the dry coating. In particular, coatings with salt-to-polymer ratios greater than 3.0 have decreased dry rub resistance. Therefore, the level of salt incorporated in the treatment coating preferably is such that on a weight basis the ratio of salt to polymer in the dried coating is less than 3.0, and more preferably in the range of 0.75 to 2.5, inclusive.

7. A clear OPP film comprising a water-based tie-layer and a water-based ink-receptive layer exactly as described in Example 3b above was printed with anionically stabilized pigment inks identical to those disclosed in U.S. Pat. No. 8,455,570 using Kodak Stream continuous inkjet print heads. Multiple test images containing patches from 0 to 100% ink coverage in 10% increments with cyan, magenta, yellow and black pigment inks as well as secondary colors red, green and blue by using the appropriate combinations of cyan, magenta, and yellow inks, and a 3-color neutral comprising equal amounts of all three primary inks. The printed test images were air-dried under ambient conditions for 24 hours and all color patches were found to be dry to the touch. The test images exhibited low levels of grain and mottle across the entire tone scale.

Three commercially water-based white flexographic inks (Sun Chemical Bianco Base 100, Sun Chemical SunStrato WB Msquared, and Flint Group Water HMJ 90104) were flood-coated over a subset of the printed test images at nominal dry coverages of 2 g/m$^2$ and permitted to air-dry. Each of these test images, along with a control that was not flood-coated with a white flexographic ink, were subsequently laminated to an unprimed transparent corona-treated 18-um OPP film. Aqueous adhesives that were used included Dow Acrylic Robond L-148 with isocyanate CR 9-101 cross linker and Aqualam 444A polyurethane with epoxy cross linker CR 7-103. After CDT the adhesives were applied using the drawdown method and IR-dried to give a dry coat weight of 2 g/m$^2$. The printed film sheet was placed on a metal plate. A separator sheet was placed on top of the print and followed by the adhesive coated clear OPP. The lead edges of the top and bottom films were taped together and to the metal plate. The bench top laminator nip (heated to the desired temperature) was briefly opened to insert the lead edge of the plate. The top film was then pulled up to quickly remove the separator sheet and the nip immediately closed. The top film was continued to be pulled upward by hand to maintain some tension on the top film to reduce the formation of wrinkles or bubbles in the laminated film. Laminations were done the same day as the adhesive was applied. The laminations were carried out at 10 inches/min under 16 psi pressure with a nip temperature of 50° C.

The laminated test images were evaluated for adhesive failure using a peel force measurement device (MTS Sintech 1/g) operating at a pull rate of 100 mm/min in the lamination direction. The laminated samples were cut to a width of 15 mm, and backing tape was used on both sides of the laminated test images to prevent stretching of the OPP films. All combinations of adhesive to white ink, adhesive to the various inkjet color patches, and adhesive to the water-based ink-receptive layer were found to exhibit peel strengths of 0.4 N/cm or greater. The optimum results were obtained with the laminated samples comprising the flood coating of Sun Chemical SunStrato WB Msquared and the Aqualam 444A/CR 7-103 two-part adhesive, which exhibited a peel force of 2.2 N/cm. Test samples without the white flood coat using this same adhesive exhibited peel forces ranging from 1.0-1.8 N/cm across the unprinted ink-receptive layer and the printed color patches. Analysis of the Sun Chemical SunStrato WB Msquared water-based white ink by the pyrolysis-gas chromatography-mass spectroscopy method indicates the presence of a polyester-polyurethane and styrene-maleic anhydride polymer binders. The Dow Chemical Aqualam 444A/CR7-103A water-based adhesive resin is as a two-part polyurethane-epoxy resin system.

This example illustrates that a water-impermeable substrate useful for flexible packaging applications, that has been coated with the combination of a water-based tie-layer and a water-based ink-receptive layer, can be successfully printed with water-based anionically stabilized pigment inks to produce test images that are dry to the touch and exhibit excellent image quality, and that these test images can be optionally post-coated with water-based white flood coats followed by adhesive lamination to a second water impermeable flexible film substrate using water-based adhesives to produce a multi-layered laminated package structure that shows excellent durability and adhesive strength. Water-based functional post-coatings comprising polyurethanes as at least part of their polymer binder systems gave the optimum results.

8. A clear OPP film comprising a water-based tie-layer and a water-based ink-receptive layer exactly as described in Example 3B above was again printed with anionically stabilized pigment inks identical to those disclosed in U.S. Pat. No. 8,455,570 using a print stand equipped with Kodak Stream continuous inkjet print heads. Each of the color ink layers was printed at a line speed of 200 m/min, with approximately a 30-sec delay between the color layers. No active drying was applied in between the color layers. A test image containing patches from 0 to 100% ink coverage in 10% increments with cyan, magenta, yellow and black pigment inks as well as secondary colors red, green and blue comprising the appropriate combinations of primary cyan, magenta, and yellow inks, and a 3-color neutral comprising equal amounts of all three primary inks. The printed test images were air-dried under ambient conditions for 24 hours and all color patches were found to be dry to the touch. The test images exhibited low levels of grain and mottle across the entire tone scale. An aqueous overprint varnish (Siegwerk Haut Brilliant 17-6040327-7) was applied to these test images using the drawdown method. Initial drying was done using a mid-IR heat lamp. To ensure all moisture was removed, a final convection oven dry was at 60° C. for 5 minutes. Varnish dry coverage was approximately 2.9 g/m$^2$. The 60° gloss of the dried, varnished prints ranged from 72-89.

A tape test as described in Examples 1, 3A, and 3B was performed on the varnished test samples. The tape was removed cleanly, with no evidence of transfer of the varnish, the inks, the ink-receptive layer, or the water-based tie-layer, demonstrating that the final multi-layered article exhibits excellent adhesive and cohesive strength and resists delamination.

Dry rub tests were done with a Sutherland Rub Tester in accordance with ISO 18947. The receptor used to rub the test prints was DataSpeed® Laser MOCR paper from International Paper. A 1.8-kg test load was used and the test was run for 10 cycles at a rate of 42 cycles/min. This test is applied to 100% coverage ("Dmax") patches of cyan, magenta, yellow, and black inks, as well as Dmax patches of red (yellow over magenta), green (yellow over cyan), and blue (magenta over cyan). After the dry rub test, % Density Removal=100×(1−(Density after Rubbing/Initial Density)) was measured. Density loss was less than 5% in all cases.

Wet rub tests were done by placing one drop of water in the center of a Dmax ink patch and waiting ten seconds before rubbing. The load during rubbing was 250 to 300 grams over an 2 approximately 0.5 cm² area. The drop is rubbed back and forth ten times and then removed by dabbing with a paper wipe. This test is applied to 100% coverage ("Dmax") patches of cyan, magenta, yellow, and black inks, as well as Dmax patches of red (yellow over magenta), green (yellow over cyan), and blue (magenta over cyan). In all areas the density loss was less than 1%.

This example shows that a water-impermeable substrate that has been coated with a water-based tie layer and a water-based ink-receptive layer comprising a water-soluble multivalent metal salt and a hydrophilic polymer binder, in that order, followed by printing with water-based inks containing an anionically stabilized pigment colorant, and then flood-coating the entire surface with a water-based protective layer, excellent print quality and durability can be achieved.

The invention has been described in detail with particular reference to certain preferred embodiments thereof, but it will be understood that variations and modifications can be effected within the scope of the invention.

PARTS LIST 100 water-impermeable substrate
200 surface modification system
300 Coating System A
301 water-based tie-layer
400 Coating System B
401 water-based ink-receptive layer
500 water-based pigment ink
501 one or more water-based pigment ink layers
600 ink deposition system
700 drying system
800 condition chamber or oven
900 post-print application system
901 post-print functional layer

The invention claimed is:

1. A multilayered structure comprising:
    a) a water-impermeable substrate;
    b) a first layer on at least one surface of the substrate comprising a water-based tie-layer composition;
    c) a second layer formed over the first layer, wherein the second layer is a water-based ink-receptive composition comprising:
        i) a multivalent metal salt; and
        ii) a hydrophilic binder polymer;
    d) a third layer including at least one water-based ink composition deposited in a single pass by an inkjet printing process, wherein the water-based ink composition comprises an anionically stabilized, water-dispersible pigment; and
    e) additional water-based layers deposited over the one or more ink layers and exposed second layer, the additional layers selected from one or more of the following compositions:
        i) an opaque white layer;
        ii) a protective layer; and
        iii) an adhesive layer, further comprising a continuous protective plastic or paper layer adhered thereto,
    wherein the dry coverage of the second layer is less than 1.5 g/m².

2. The multilayered structure of claim 1, wherein the water-impermeable substrate is selected from polyesters, polyimides, polycarbonates, polystyrenes, polyolefins, polyurethanes, polyvinyl acetates, polyvinyl chlorides, polyvinylidene chlorides, and copolymers, mixtures, co-extrudates, or laminates thereof.

3. The multilayered structure of claim 1, wherein the water-based tie-layer comprises polyvinyl alcohol, polyvinyl amine, gelatin, poly(ethyleneimine), epoxy resins, polyurethane, polyacrylamide, and derivatives, copolymers, and blends thereof.

4. The multilayered structure of claim 1, wherein the water-based tie-layer comprises a polymer or copolymer comprising 50 to 100 mole percent of glycidyl acrylate or glycidyl methacrylate monomers.

5. The multilayered structure of claim 1, wherein the water-based tie-layer comprises two sub layers, the first water-based tie-sub-layer comprising poly(ethyleneimine) and epoxy resins modified with an acidified aminoethylated vinyl polymer, and a second water-based tie-sub-layer, which is applied on top of the first sub-layer, is a cross-linked poly(vinyl alcohol) polymer.

6. The multilayered structure of claim 1, wherein the multivalent metal salt is a calcium or magnesium salt and the hydrophilic polymer binder is a cross-linked poly(vinyl alcohol).

7. The multilayered structure of claim 1, wherein the water-based ink composition comprises less than 10 wt % water miscible co-solvent.

8. The multilayered structure of claim 1, wherein the anionically stabilized, water-dispersible pigment is dispersed with an anionic polymer comprising carboxylate functionality.

9. The multilayered structure of claim 1, wherein the opaque white layer composition is a water-based white flexographic ink.

10. The multilayered structure of claim 1, wherein the opaque white layer composition is a water based white inkjet ink.

11. The multilayered structure of claim 1, wherein the protective layer composition is a water-based polyurethane.

12. The multilayered structure of claim 1, wherein the adhesive layer composition is a solventless two-part water-based polyurethane resin with an epoxy resin cross linker applied in combination with a second water-impermeable substrate.

13. The multilayered structure of claim 12, wherein the second water-impermeable substrate is selected from polyesters, polyimides, polycarbonates, polystyrenes, polyolefins, polyurethanes, polyvinyl acetates, polyvinyl chlorides, polyvinylidene chlorides, and copolymers, mixtures, co-extrudates, or laminates thereof.

14. The multilayered structure of claim 9 further comprising the protective layer composition wherein the protective layer composition is a water-based polyurethane.

15. The multilayered structure of claim 9 further comprising the adhesive layer composition wherein the adhesive layer composition is a solventless two-part water-based polyurethane resin with an epoxy resin cross linker applied in combination with a second water-impermeable substrate.

16. The multilayered structure of claim 12, wherein the lamination bond strength is >1.0 N/cm.

17. The multilayered structure of claim 12, wherein the lamination bond strength is >1.5 N/cm.

18. The multilayered structure of claim 1, wherein the second layer comprises between 0.05 g/m$^2$ and 1.0 g/m$^2$ of the hydrophilic binder polymer, and the weight ratio of the multivalent metal salt to the hydrophilic binder polymer is between 2.5:1 and 0.75:1.

* * * * *